United States Patent
Agrawal et al.

(10) Patent No.: US 9,504,934 B2
(45) Date of Patent: Nov. 29, 2016

(54) MULTICOMPONENT DIVIDING WALL COLUMNS

(71) Applicant: Purdue Research Foundation, West Lafayette, IN (US)

(72) Inventors: Rakesh Agrawal, West Lafayette, IN (US); Gautham Madenoor Ramapriya, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 260 days.

(21) Appl. No.: 14/525,205

(22) Filed: Oct. 27, 2014

(65) Prior Publication Data

US 2015/0119612 A1  Apr. 30, 2015

Related U.S. Application Data

(60) Provisional application No. 61/896,122, filed on Oct. 27, 2013.

(51) Int. Cl.
  *C07C 7/04* (2006.01)
  *B01D 3/14* (2006.01)

(52) U.S. Cl.
  CPC .................... *B01D 3/141* (2013.01)

(58) Field of Classification Search
  CPC ........ B01D 3/14; B01D 3/141; B01D 3/145; B01D 3/146; B01D 3/148; C07C 7/04; F25J 3/02; Y10S 203/00
  USPC .......... 585/800, 805, 802; 62/617, 620, 901; 62/905; 203/39, 44, 45, 46, 71, 81, 86; 202/84, 85, 96, 97; 208/308, 347, 350, 208/351
  See application file for complete search history.

(56) References Cited

U.S. PATENT DOCUMENTS 2,295,256 A  9/1942  Brugma
2,471,134 A  5/1949  Wright
(Continued)

FOREIGN PATENT DOCUMENTS

EP  1514955 B1  5/2006

OTHER PUBLICATIONS

Fidkowski, Z.T., Krolikowski, L. Thermally coupled system of distillation columns: optimization procedure. AIChE J. 1986; 32:537-546.
(Continued)

*Primary Examiner* — Sharon Pregler
(74) *Attorney, Agent, or Firm* — Purdue Reearch Foundation

(57) ABSTRACT

For an n-component mixture (n≥3), an array of new distillation columns is disclosed with vertical partitions that allow independent control of the vapor flowrates in each partitioned zone, while operating the columns to produce constituent product streams. Specifically, all such more operable columns with vertical partitions for ternary and quaternary feed mixtures are illustrated. For a ternary feed, through extensive computation, the minimum heat duty for each of the new columns is same as for the FTC configuration. The new columns with vertical partitions become even more attractive when the vapor split between column sections must be controlled within a narrow range. Finally, it is disclosed how a new column with vertical partition(s) drawn for an n-component mixture can be adapted to distil feed mixtures that contain more than n-components.

19 Claims, 33 Drawing Sheets

(56) References Cited

U.S. PATENT DOCUMENTS

| | | | |
|---|---|---|---|
| 3,058,893 | A | 10/1962 | Cahn |
| 6,387,222 | B1 | 5/2002 | Tragut |
| 6,550,274 | B1 * | 4/2003 | Agrawal ............ B01D 3/14 62/617 |
| 6,848,389 | B1 | 2/2005 | Elsasser |
| 7,001,490 | B2 | 2/2006 | Wostbrock |
| 7,118,653 | B2 | 10/2006 | Brady |
| 7,211,698 | B2 | 5/2007 | Heydrich |
| 7,211,701 | B2 | 5/2007 | Muller |
| 7,329,330 | B2 | 2/2008 | Gall |
| 7,332,634 | B2 | 2/2008 | Bassler |
| 7,368,610 | B2 | 5/2008 | Hugo |
| 7,371,912 | B2 | 5/2008 | Schultz |
| 7,687,048 | B1 | 3/2010 | Schultz |
| 7,713,386 | B2 | 5/2010 | Schultz |
| 8,088,944 | B2 | 1/2012 | Woelfert |
| 8,282,793 | B2 | 10/2012 | Heydrich |
| 8,414,744 | B2 | 4/2013 | Heydrich |
| 2004/0011706 | A1 | 1/2004 | Kaibel |
| 2006/0014969 | A1 | 1/2006 | Bassler |
| 2007/0293688 | A1 | 12/2007 | Siegert |
| 2010/0113805 | A1 | 5/2010 | Windecker |

OTHER PUBLICATIONS

Ho, Y.C., et al., Quantifying Potential Energy Savings of Divided Wall Columns Based on Degree of Remixing. Ind Eng Chem Res. 2011;50(3):1473-1487.

Agrawal R, Fidkowski ZT. More operable arrangements of fully thermally coupled distillation columns. AIChE J. 1998;44(11):2565-2568.

Agrawal R. Thermally Coupled Distillation with Reduced Number of Intercolumn Vapor Transfers. AIChE J. 2000;46(11):2198-2210.

Kaibel B, Jansen H, Zich E, Olujic Z. Unfixed Dividing Wall Technology for Packed and Tray Distillation Columns. Distill Absorpt. 2006;152:252-266.

Agrawal R, Fidkowski ZT. Are Thermally Coupled Distillation Columns Always Thermodynamically More Efficient for Ternary Distillations? Ind Eng Chem Res. 1998;37(8):3444-3454.

Agrawal R. Multicomponent Columns with Partitions and Multiple Reboilers and Condensers. Ind Eng Chem Res. 2001;40(20):4258-4266.

Dejanovic I, Matijasevic L, Olujic Z. Dividing wall column—A breakthrough towards sustainable distilling. Chem Eng Process. 2010;49:559-580.

Sangal VK, Bichalu L, Kumar V and Mishra IM. Importance of pressure drop in divided wall distillation column. Asia-Pac J Chem Eng. 2013;8:85-92.

Lestak F, Collins C. Advanced distillation saves energy & capital. Chem Eng. 1997;104(7):72-76.

Dejanovic I, Matijasevic L, Jansen H, Olujic Z. Designing a Packed Dividing Wall Column for an Aromatics Processing Plant. Ind Eng Chem Res. 2011;50:5680-5692.

Mutalib Mia, Smith R. Operation and Control of Dividing Wall Distillation Columns. Part 1: Degrees of Freedom and Dynamic Simulation. Trans Inst Chem Eng. 1998;76:Part A:308-318.

Maralani LT, Xigang Y, Yiqing L, Chao G, Guocong Y. Numerical Investigation on Effect of Vapor Split Ratio to Performance and Operability for Dividing Wall Column. Chin J Chem Eng. 2013;21(1):72-78.

Agrawal, R., Synthesis of Distillation Column Configurations for a Multicomponent Separation. Ind. Eng. Chem. Res. 1996;35(4):1059-1071.

Agrawal, R, Fidkowski ZT. Are Thermally Coupled Distillation Columns Always Thermodynamically More Efficient for Ternary Distillations? Ind Eng Chem Res. 1998;37(8):3444-3454.

Agrawal, R. Multicomponent Columns with Partitions and Multiple Reboilers and Condensers. Ind Eng Chem Res. 2001;40(20):4258-4266.

Asprion, N., et al., Dividing wall columns: Fundamentals and recent advances. Chemical Engineering and Processing 49 (2010) 139-146.

Sangal, V.K., Bichalu L, Kumar V and Mishra IM. Importance of pressure drop in divided wall distillation column. Asia-Pac J Chem Eng. 2013;8:85-92.

* cited by examiner

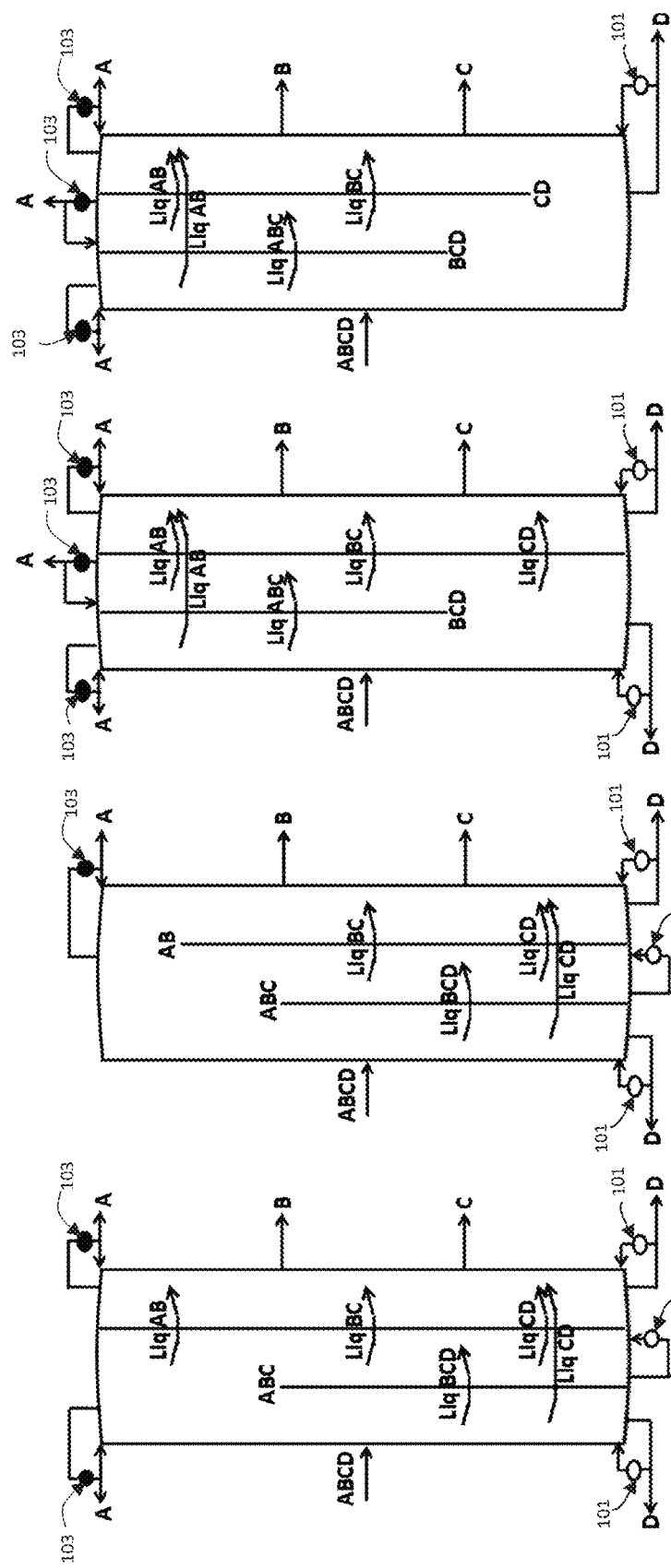

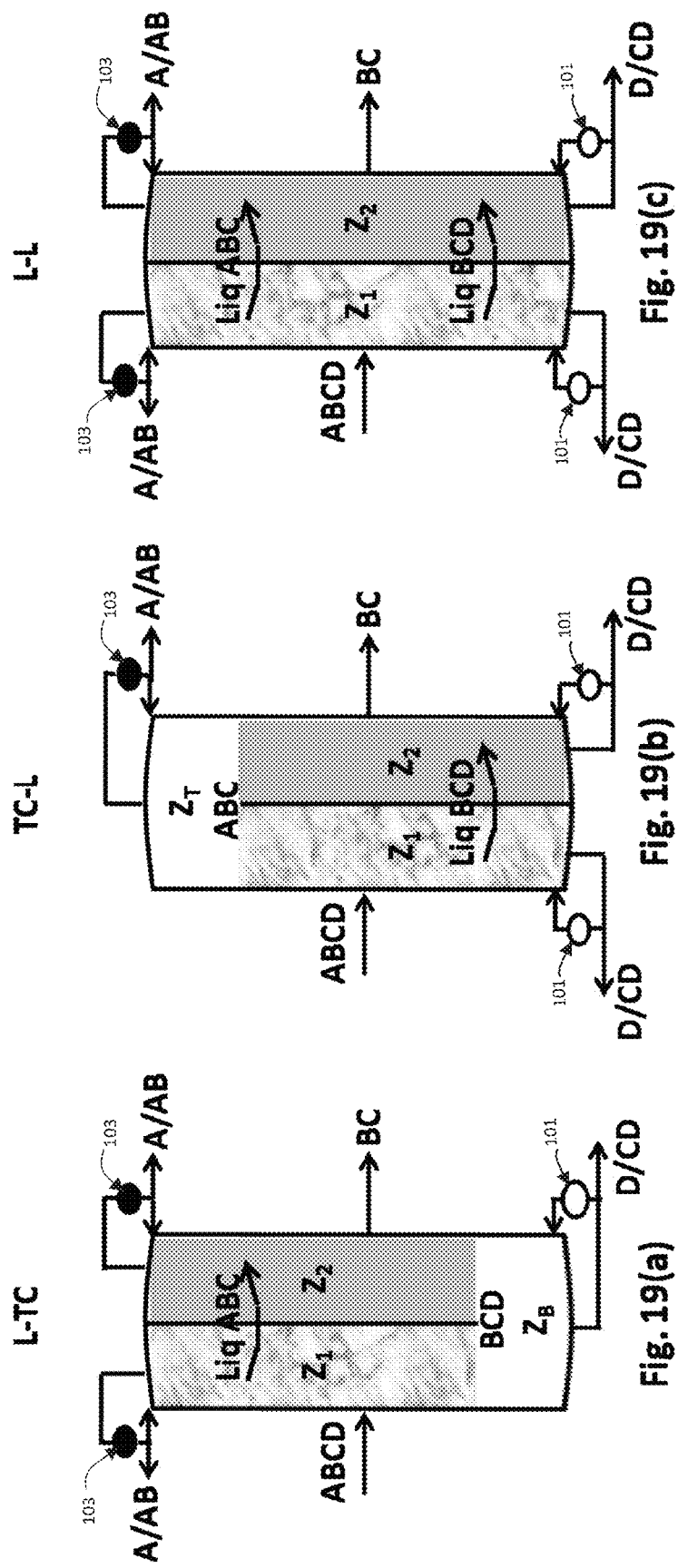

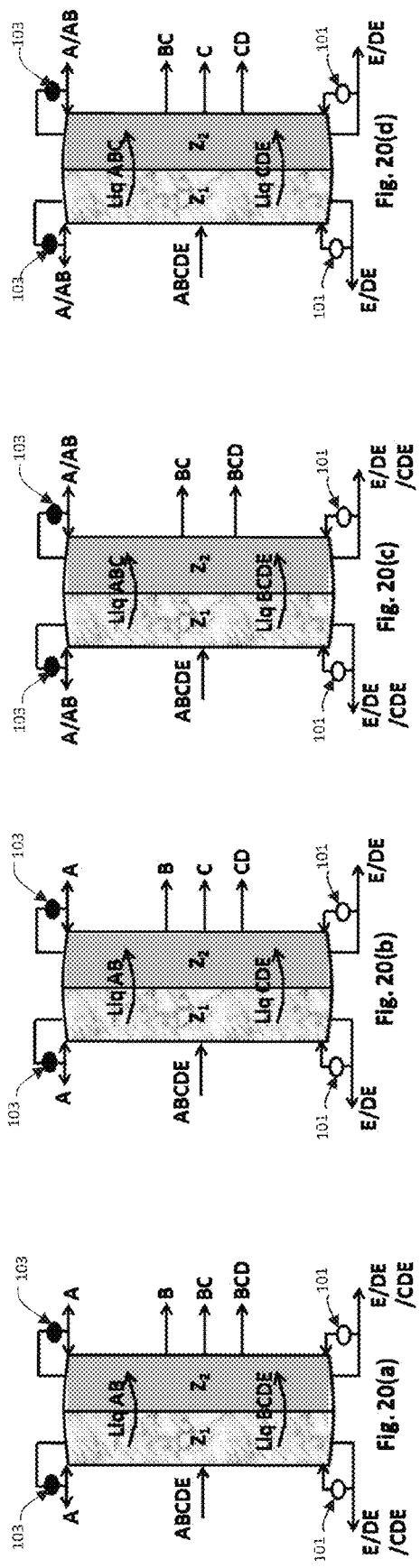

MULTICOMPONENT DIVIDING WALL COLUMNS

CROSS-REFERENCE TO RELATED APPLICATIONS

The present U.S. patent application is related to and claims the priority benefit of U.S. Provisional Patent Application Ser. No. 61/896,122, filed Oct. 27, 2013, the contents of which is hereby incorporated by reference in its entirety into this disclosure.

TECHNICAL FIELD

The present disclosure generally relates to distillation columns, and in particular to configurations of dividing wall columns.

BACKGROUND OF THE INVENTION

Thermal coupling links in distillation are known to reduce the overall costs of a configuration on a plant, owing to simultaneous reduction in capital and operating costs. Referring to FIG. 1, a fully thermally coupled three-component Petlyuk configuration with thermal coupling links at submixtures AB and BC is shown. In all the figures of this patent application, unfilled circles denote reboilers 101, while filled circles denote condensers 103. Furthermore, the configuration of FIG. 1 is referred to as the TC-TC configuration. The first and second 'TC' respectively denote the thermal coupling links at submixtures AB and BC.

Despite its potential to significantly reduce the overall costs, the TC-TC configuration has seen limited industrial application. One reason for this is the operability issue that accompanies the TC-TC configuration. In FIG. 1, vapor AB is withdrawn from the top of a first column 105, and fed to a second column 107. Still referring to FIG. 1, this requires the pressure at the top of section 1b to be greater than that at the bottom of section 2a (assuming compressors are not used in the transfer line). Further, vapor BC is withdrawn from the top of section 2d, and fed to the bottom of column 1. This requires the pressure at the top of section 2d to be greater than that at the bottom of section 1c. Such conflicting pressure requirements in the two distillation columns bring in operational complications to the TC-TC configuration. To overcome these operability issues, Agrawal and Fidkowski suggested the use of configurations in FIGS. 2a and 2b, which are thermodynamically equivalent to the TC-TC configuration. In the configurations of FIGS. 2a and 2b, the pressure in one column can be uniformly maintained greater than the other column, which simplifies some of the major operational complications of the TC-TC configuration.

For further savings in plant space and capital costs, the TC-TC configuration can be incorporated into a single shell, popularly called the dividing wall column, as shown in FIG. 3. This configuration shall be henceforth referred to as the TC-TC column. A naming system has been adopted where TC-TC configuration refers to the two-column configuration shown in FIG. 1, and TC-TC column refers to the one column system with a vertical partition as shown in FIG. 3. Also, it is to be noted that, later in the disclosure herein, the skeleton partitioning arrangement/structure of FIG. 3 is referred to by the same name (TC-TC column), even when it is used for separating four or higher component feeds. In the case of multicomponent separations using TC-TC column, the submixtures transferred at the thermal couplings will differ from what is shown in FIG. 3. Further, for convenience, the different parts of dividing wall columns in the paper are shaded and named distinctly to represent different zones. For example, the TC-TC column of FIG. 3 is divided into four zones, namely $Z_T$, $Z_B$ and the vertical partition's zones $Z_1$ and $Z_2$.

Although the dividing wall column was introduced by Wright as early as 1949, the first industrial application of this column did not happen until the late 1980s. Since then, the use of multicomponent dividing wall columns has seen a rapid increase in several industrial applications. Updates on the recent developments in dividing wall columns can be found in the works of Aspiron and Kaibel, Dejanovic et al. and Yildirim et al.

Though the TC-TC column of FIG. 3 offers ample opportunity to reduce overall costs, it suffers from somewhat similar operability issues (related to pressure) as the TC-TC configuration of FIG. 1. The pressure drop in the TC-TC column is an important consideration for its onsite operation. In the TC-TC column, the pressure drop in the two parallel zones, $Z_1$ and $Z_2$ of the vertical partition, on either side of the vertical partition, are constrained to be equal. Subject to this constraint and the mechanical resistances in the vertical partition's $Z_1$ and $Z_2$ zones, there is a natural uncontrolled split of the vapor ascending from the zone $Z_B$ into the vertical partition's zones $Z_1$ and $Z_2$. This uncontrolled split implies that the relative vapor flowrates in zones $Z_1$ and $Z_2$ of the vertical partition cannot be manipulated during operation. Though methods to address the control of the vapor split issue during the design and dimensioning phase of the TC-TC column have been proposed, none exists for application during online operation. This vapor split can significantly affect the product purities, total annualized costs, and has implications on how far the TC-TC column is away from its optimal operation. Though the liquid split at the top of the vertical partition also can have similar effects, it is generally well-controlled during operation, using collectors and distributors. Further, the operable versions of the TC-TC configuration shown in FIGS. 2a and 2b also simplify to the same dividing wall column arrangement of FIG. 3. Hence, the operational advantages in the configurations of FIGS. 2a and 2b over the TC-TC configuration are not translated to their dividing wall versions.

Alternate dividing wall columns, as shown in FIGS. 4a and 4b, operating in the side-stripper and side-rectifier modes have been proposed in the literature. In these dividing wall columns, the split of vapor to the two parallel zones $Z_1$ and $Z_2$ of the vertical partition can be controlled using the reboilers 101 and condensers 103. Also, these dividing wall columns are often thermodynamically more efficient than the TC-TC column. However, they do not always retain the same minimum heat duty requirements as the TC-TC column for all feed conditions.

SUMMARY

Disclosed herein is a method for separating feed stream containing a more volatile component, at least one intermediate volatile component and a less volatile component by feeding the feed to a distillation column containing one or more vertical partitions and is characterized by any one of the following embodiments.

In one embodiment (L-TC configuration): (i) a first vertical partition that starts at the top of the distillation column, continues and ends at a vertical location that is below the feed location to the distillation column and above the bottom of the column providing the zone $Z_1$; (ii) the column is operated such that the feed is fed to an intermediate location of zone $Z_1$ and (iii) at least one liquid stream, called the first intermediate stream, depleted in the less volatile component is withdrawn from an intermediate location of the first vertical partition's zone $Z_1$ that is above the feed location and fed to an intermediate location of a second zone of the distillation column, and (iv) the column is operated such that at least one product stream enriched in the more volatile component is produced from a location in the first vertical partition's zone $Z_1$ above the location from where the first intermediate stream is withdrawn, and (v) at least one product stream enriched in the more volatile component is recovered from the second zone at a location that is above the location where the first intermediate stream is fed; (vi) at least one product stream enriched in an intermediate volatile component is withdrawn from a zone which is different from zone $Z_1$ and the withdrawal location of this stream is at an intermediate height of the column and, (vii) at least one product stream enriched in the less volatile component is withdrawn from a location in the distillation column below the bottom of the first vertical partition.

In another embodiment, (TC-L configuration): (i) a first vertical partition that starts at the bottom of the distillation column, continues and ends at a vertical location that is above the feed location to the distillation column and below the top of the column providing the zone $Z_1$; (ii) the column is operated such that the feed is fed to an intermediate location of zone $Z_1$ and (iii) at least one liquid stream, called the second intermediate stream, depleted in the more volatile component is withdrawn from an intermediate location of the first vertical partitions zone $Z_1$ that is below the feed location and fed to an intermediate location of a second zone of the distillation column, and (iv) the column is operated such that at least one product stream enriched in the more volatile component is withdrawn from a location in the distillation column above the top of the first vertical partition, and (v) at least one product stream enriched in an intermediate volatile component is withdrawn from a zone which is different from zone $Z_1$ and the withdrawal location of this stream is at an intermediate height of the column and, (vi) at least one product stream enriched in the less volatile component is produced from a location in the first vertical partition's zone $Z_1$ below the location from where the second intermediate stream is withdrawn, and (vii) at least one product stream enriched in the less volatile component is recovered from the second zone at a location that is below the location where the second intermediate stream is fed.

In another embodiment, (L-L configuration): (i) a first vertical partition that starts at the top of the distillation column, continues and ends at the bottom of the distillation column providing the zone $Z_1$; (ii) the column is operated such that the feed is fed to an intermediate location of zone $Z_1$ and (iii) at least one liquid stream, called the first intermediate stream, depleted in the less volatile component is withdrawn from an intermediate location of the first vertical partition's zone $Z_1$ that is above the feed location and fed to an intermediate location of a second zone of the distillation column, and (iv) at least one liquid stream, called the second intermediate stream, depleted in the more volatile component is withdrawn from an intermediate location of the first vertical partition's zone $Z_1$ that is below the feed location and fed to an intermediate location of a second zone of the distillation column that is below where the first intermediate stream is fed, and (v) the column is operated such that at least one product stream enriched in the more volatile component is produced from a location in the first vertical partition's zone $Z_1$ above the location from where the first intermediate stream is withdrawn, and (vi) at least one product stream enriched in the more volatile component is recovered from the second zone at a location that is above the location where the first intermediate stream is fed; (vii) at least one product stream enriched in an intermediate volatile component is withdrawn from a zone which is different from zone $Z_1$ and the withdrawal location of this stream is at an intermediate height of the column and, (viii) at least one product stream enriched in the less volatile component is produced from a location in the first vertical partition's zone $Z_1$ below the location from where the second intermediate stream is withdrawn, and (ix) at least one product stream enriched in the less volatile component is recovered from the second zone at a location that is below the location where the second intermediate stream is fed.

BRIEF DESCRIPTION OF THE DRAWINGS

FIG. 16a is a schematic showing a variant of the configurations in FIGS. 15a and 15b.

FIG. 16b is a schematic showing a variant of the configurations in FIGS. 15a and 15b.

FIG. 16c is a schematic showing a variant of the configurations in FIGS. 15a and 15b.

FIG. 16d is a schematic showing a variant of the configurations in FIGS. 15a and 15b.

FIGS. 19a-19l show possible combinations of a situation from an intermediate location below the feed, the two possible submixture transfers are BCD or BC, implying that, for each of the three vertical partitioned columns, we have four possible combinations of the two submixtures.

FIGS. 20a-20h are schematics showing the various operating modes of the L-L column to separate a quinary mixture.

DETAILED DESCRIPTION

Figure 1:
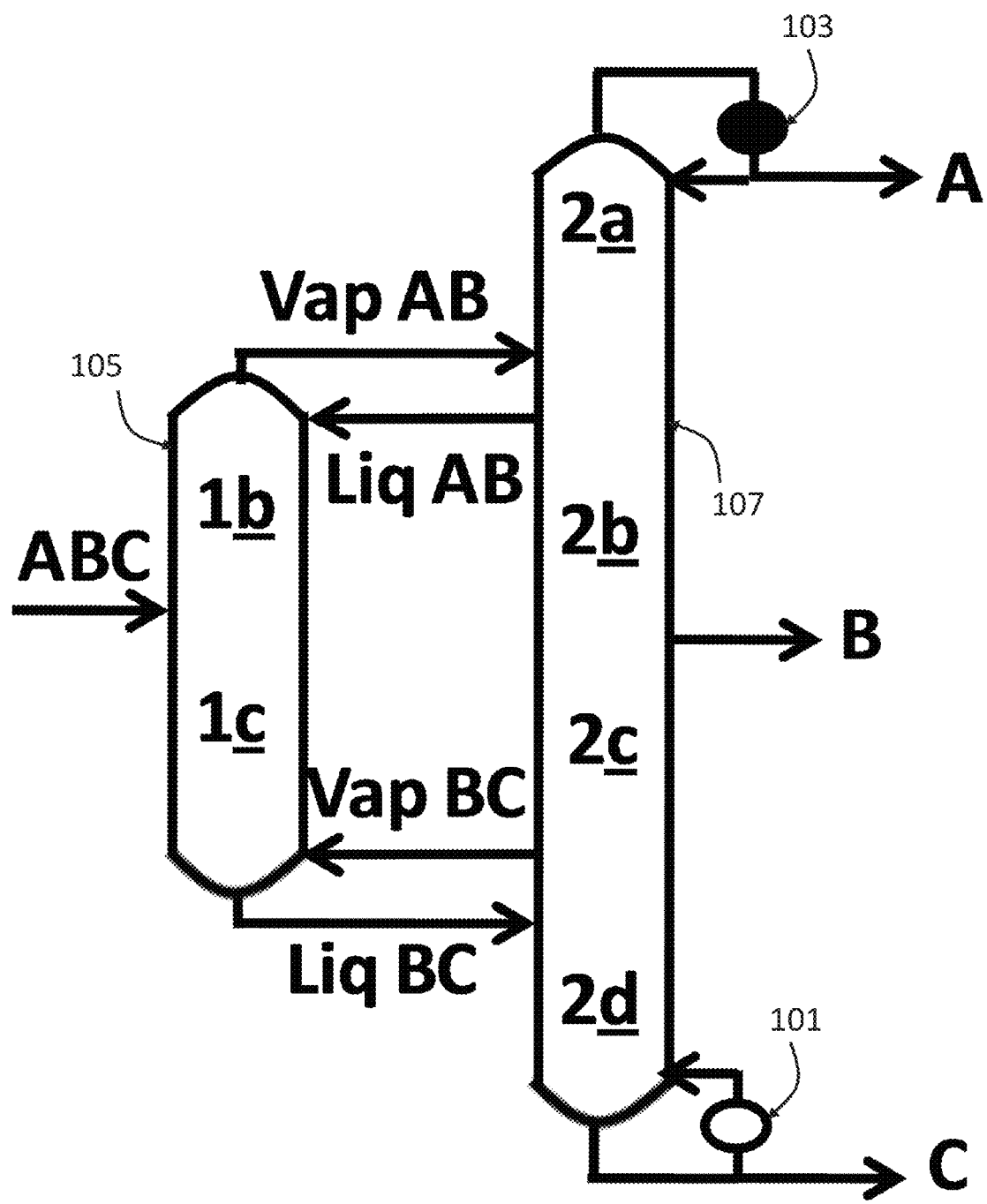
FIG. 1 is a schematic showing a fully thermally coupled three-component Petlyuk configuration with thermal coupling links at submixtures AB and BC.
Figure 2A:
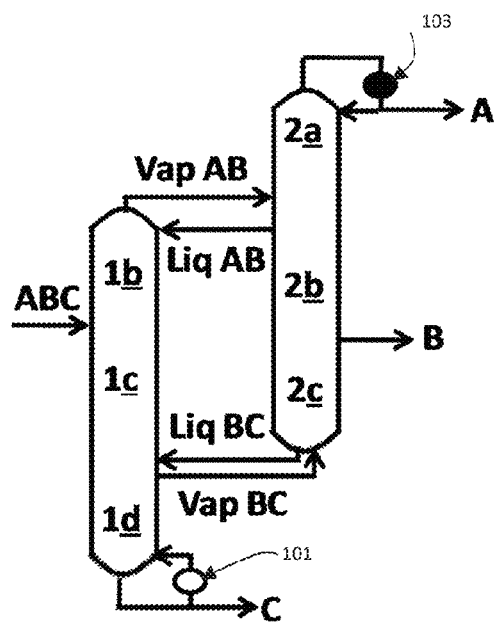
FIG. 2a is a schematic showing an operable version of the TC-TC configuration.
Figure 2B:
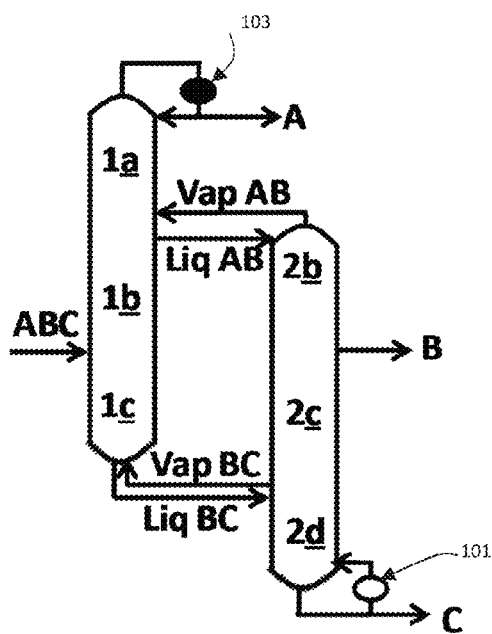
FIG. 2b is a schematic showing an operable version of the TC-TC configuration.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Presented herein are new dividing wall columns that are more operable than the TC-TC column and operate with approximately the same minimum heat duty as the TC-TC column (or configuration).

Following are brief definitions of key terms used in the present disclosure.

A, B, C, D, E denote components with volatilities decreasing in the same order that are present in a feed mixture ABCDE. A is the most volatile component and E is the least volatile component and B, C and D are components of intermediate volatility with B being more volatile than C, and C being more volatile than D. The feed mixture for separation using the invention described here may be from the group but are not limited to benzene/toluene/xylene mixtures, nitrogen/oxygen/argon mixtures, nitrogen/carbon mono-oxide/methane mixtures, combinations of three or more components from C1 to C5 alcohols, and hydrocarbon mixtures, the mentioned hydrocarbon mixtures could be any from the set of pentane/hexane/heptane, isopentane/pentane/hexane, butane/isopentane/pentane, isobutene/n-butane/gasoline, and combinations of at least three components from C1 to C10 hydrocarbons or $C_4$ isomers. Further, the invention could be used to separate benzene from pyrolysis gasoline, C7+aromatics from C7+olefin/paraffin or for separations by distillation as described in References 23 to 42.

Streams are named according to the components they predominantly contain. For example BC is a stream that is primarily a mixture of components B and C, but may contain traces or acceptable concentrations of other components. Similarly, a product stream A may contain acceptable concentration of other components but will primarily be rich in A.

More volatile component means, for a given feed, any feasible stream that contains the most volatile component of the feed. For feed ABC, more volatile component implies any one of AB or A. For feed ABCD, more volatile component implies any one of ABC or AB or A. For feed ABCDE, more volatile component implies any one of ABCD or ABC or AB or A.

Intermediate volatile component means, for a given feed, any feasible stream that is lean in the most volatile and the least volatile components of the feed. For feed ABC, intermediate volatile component implies B. For feed ABCD, intermediate volatile component implies any one of BC or B or C. For feed ABCDE, intermediate volatile component implies any one of BCD or BC or CD or B or C or D.

Less volatile component means, for a given feed, any feasible stream that contains the least volatile component of the feed. For feed ABC, less volatile component implies any one of BC or C. For feed ABCD, less volatile component implies any one of BCD or CD or D. For feed ABCDE, less volatile component implies any one of BCDE or CDE or DE or E.

A stream enriched in the more volatile component (less volatile component) means, in such a stream, the ratio of the flow rate of the more volatile component (less volatile component) to the flow rate of the least volatile component (most volatile component) present in the feed is higher than the corresponding value for the feed.

A stream depleted in the more volatile component (less volatile component) means, in such a stream, the ratio of the flow rate of the more volatile component (less volatile component) to the flow rate of the least volatile component (most volatile component) present in the feed is lower than the corresponding value for the feed.

A stream enriched (depleted) in the intermediate volatile component means, in such a stream, at least one of the two ratios—the ratio of the flow rate in the stream of the intermediate volatile component, to the flow rate in the stream of the feed's least volatile component, or the ratio of the flow rate in the stream of the intermediate volatile component, to the flow rate in the stream of the feed's most volatile component, is higher (lower) than in the feed.

In general, depending on the context, a product stream enriched in the less volatile component may contain components in addition to the least volatile component, but these additional components are the ones whose volatility is adjacent to the least volatile component. For example, for a feed mixture ABCD, where D is the least volatile component, a stream enriched in the less volatile component may contain either one of the following: D, or CD, or BCD.

Similarly, depending on the context, a stream enriched in the intermediate volatile component may contain one or more components of intermediate volatilities. For example, for the feed mixture ABCD, the stream enriched in the intermediate volatile component may be any one of the following: B, C, or BC. Likewise, depending on the context, a product stream enriched in the more volatile component may contain components in addition to the most volatile component, but these additional components are the ones whose volatility is adjacent to the most volatile component. For example, for a feed mixture ABCD, a stream enriched in the more volatile component may contain either one of the following: A, or AB, or ABC.

Figure 5A:
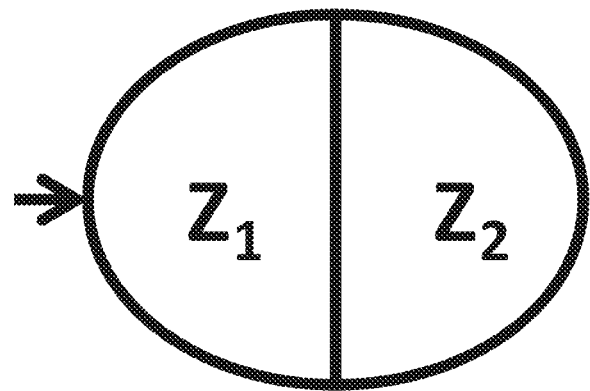
FIG. 5a shows the top view of the distillation column when the vertical partition is a dividing wall.
Figure 5B:
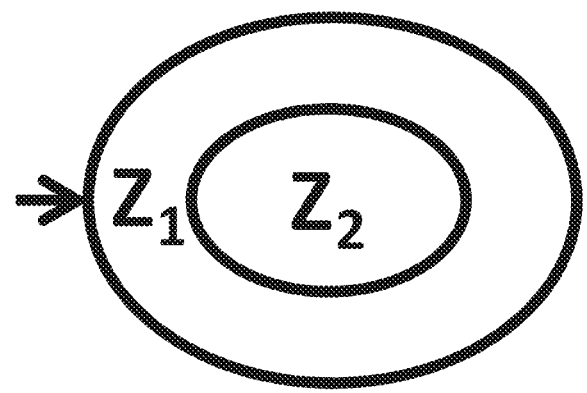
FIG. 5b shows show the top view of the distillation column when the vertical partition is a concentric cylinder.
Figure 5C:
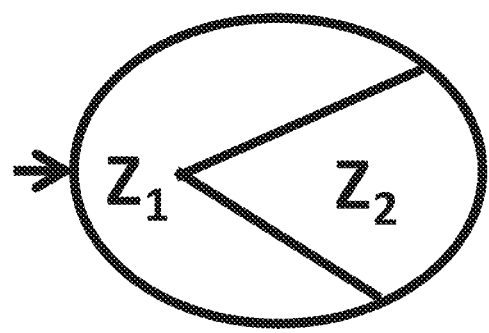
FIG. 5c show the top view of a possible arbitrarily shaped vertical partition that could be used in a distillation column.
Figure 5D:
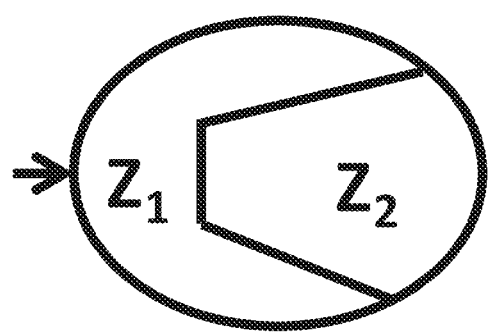
FIG. 5d shows the top view of two possible arbitrarily shaped vertical partition that could be used in a distillation column.
Figure 6A:
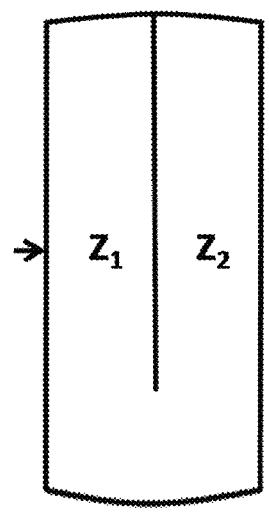
FIGS. 6a, 6b, 6c, and 6d respectively show the front views of the distillation columns in FIGS. 5a, 5b, 5c, and 5d.
Figure 6B:
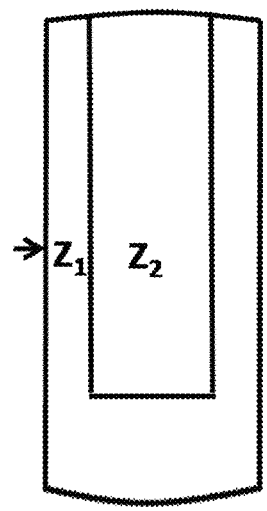
Figure 6C:
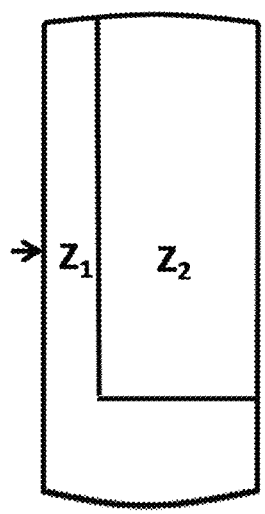
Figure 6D:
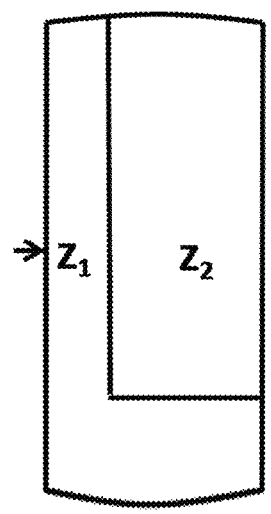

Vertical partition means, any physical separation that is used to prevent the exchange of mass between the two sides of the vertical partition inside the distillation column. FIGS. 5a and 5b show the top view of the distillation column when the vertical partition is a dividing wall and concentric cylinder respectively. FIGS. 5c and 5d show the top view of two possible arbitrarily shaped vertical partitions that could be used in a distillation column. FIGS. 6a, 6b, 6c, and 6d respectively show the front views of the distillation columns in FIGS. 5a, 5b, 5c, and 5d.

The shapes of the distillation columns shown in the figures are not to be construed as implying that only cylindrical distillation columns are possible. Rather, the distillation column's diameter may vary at any location along the height of the column. Similarly, partitions are a partition is any physical separation of any shape, which prevents the liquid and vapor of its two sides from mixing inside the distillation column.

Use of a vertical partition divides a column shell into a least two zones, each on either side of the vertical partition. In this case, the zone on any one side of the partition is the region between the vertical partition and the column shell on that side. A zone has separation stages for liquid-vapor contact. Thus, in FIG. 1, a vertical partition provides two zones Z1 and Z2 and there are separation stages in each of the zones. When a column contains more than one vertical partition, then there are additional zones between the adjacent vertical partitions and also between the column shell and some of the vertical partitions that are adjacent to the column shell. In our invention, a zone is fed with a stream at an intermediate location. This stream may be the given feed mixture for distillation. Alternatively, this stream may be another stream derived from the feed mixture. In this case, the derived stream is withdrawn from another distillation zone.

Generally, when it is said that a stream is withdrawn from a location in a column or a zone which is below the withdrawal or feed location of another stream, then it means that there is one or more separation stages between the two locations. Same is true when a stream is fed above a location where another stream is either fed or withdrawn. Similarly, when it is said that a stream is fed or withdrawn from an intermediate location of a zone or a distillation column, it is meant that there are one or more separation stages above as well as below the location under consideration. By separation stages, it is meant mass transfer contact devices such as trays, structured or random packing, etc.

A distillation column operated in an advantageous manner means, the operation of the distillation column accompanied by a reduction in total heat duty in the reboilers of the distillation column or attainment of desired product purities.

Cooling medium means, a stream of sufficiently low temperature used in a heat exchanger that allows heat exchange with a process stream to reduce the process stream's enthalpy content.

Heating medium means, a stream of sufficiently high temperature used in a heat exchanger that allows heat exchange with a process stream to increase the process stream's enthalpy content.

Streams of similar composition means, in such streams, the ratio of each component's flowrate in one stream to the total flowrate of that stream is similar to the corresponding values in every other stream.

Streams of dissimilar composition means, in such streams, the ratio of at least one component's flowrate in one stream to the total flowrate of that stream is not equal to the corresponding values for every other stream.

New, More Operable Dividing Wall Columns

Figure 7A:
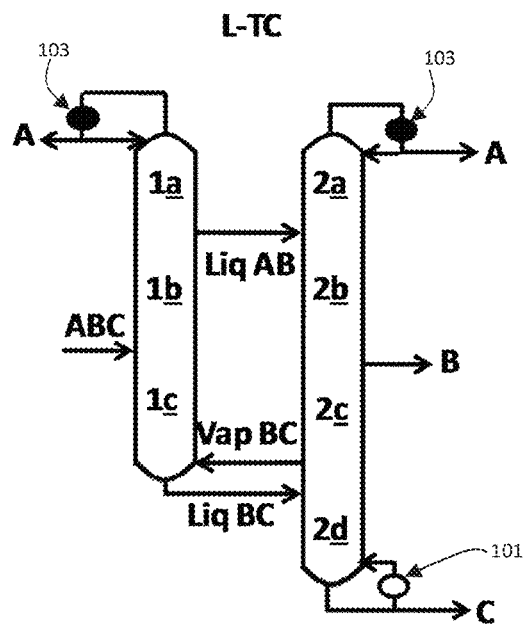
FIG. 7a is a schematic showing a possible distillation configuration.
Figure 7B:
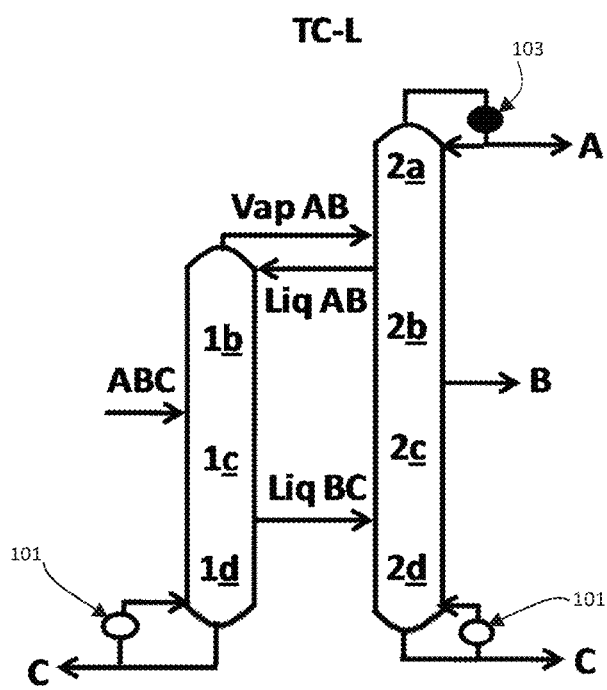
FIG. 7b is a schematic showing a possible distillation configuration.
Figure 7C:
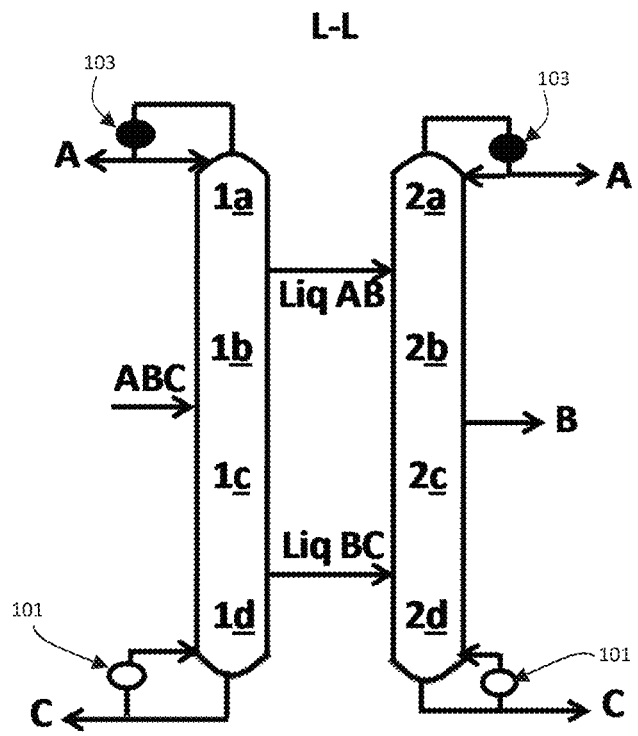
FIG. 7c is a schematic showing a possible distillation configuration.

Distillation configurations with liquid transfers between distillation columns are easier to operate and control than configurations with vapor transfers between distillation columns. Based on this fact, for the distillation of a ternary mixture, Agrawal proposed the three configurations of FIGS. 7a, 7b, and 7c, which are more operable than the TC-TC configuration. Further, based on physical reasoning, he proposed that the configurations of FIGS. 7a, 7b, and 7c have the same overall minimum vapor requirement as the TC-TC configuration, and hence, are equivalent to the TC-TC configuration. Through modeling and extensive computation, we confirm this equivalence. Furthermore, this is disclosure refers to the configurations of FIGS. 7a, 7b, and 7c as the L-TC, TC-L and L-L configurations, respectively. For example, the L-TC configuration is named so because of the liquid transfer at submixture AB and thermal coupling link at submixture BC.

The low heat duty requirement of the L-TC configuration, for example, can be partially understood by the fact that, with the same vapor that enters distillation column 1 at the bottom, for separating feed ABC into AB and BC, some A is also distilled from the top of the first column. Hence, this quantity of A is absent from the system for separation in column 2, which potentially reduces the heat duty requirement of this column. A similar analysis can be extended to understand the low heat duty requirements of the TC-L and L-L configurations.

Figure 8A:
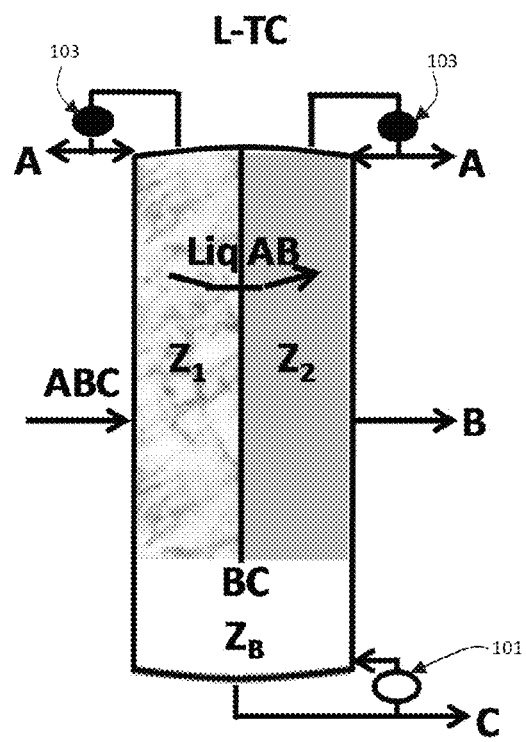
FIG. 8a is a schematic showing a new, more operable dividing wall column version of the L-TC configuration.
Figure 8B:
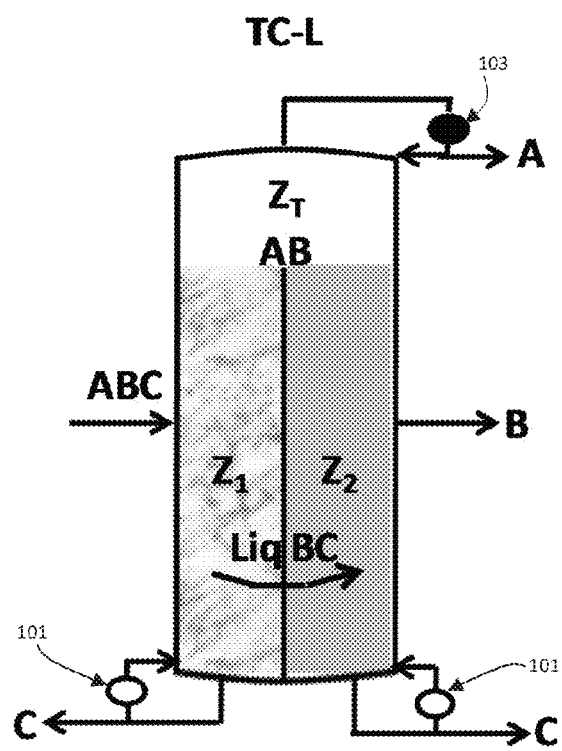
FIG. 8b is a schematic showing a new, more operable dividing wall column version of the TC-L configuration.
Figure 8C:
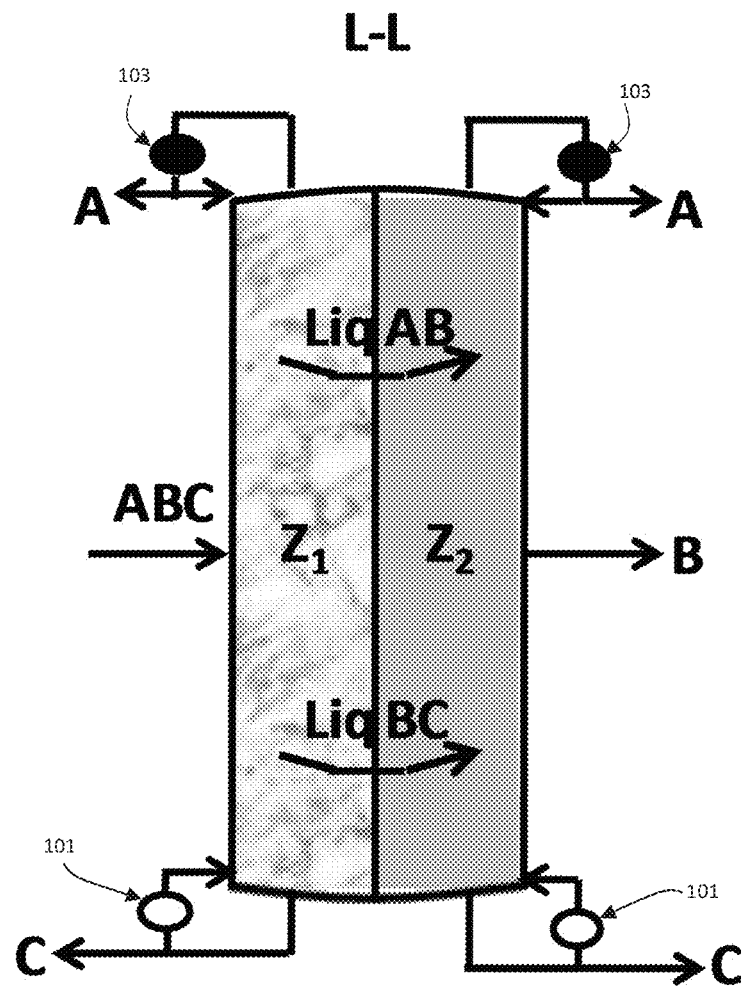
FIG. 8c is a schematic showing a new, more operable dividing wall column version of the L-L configuration.
Figure 9:
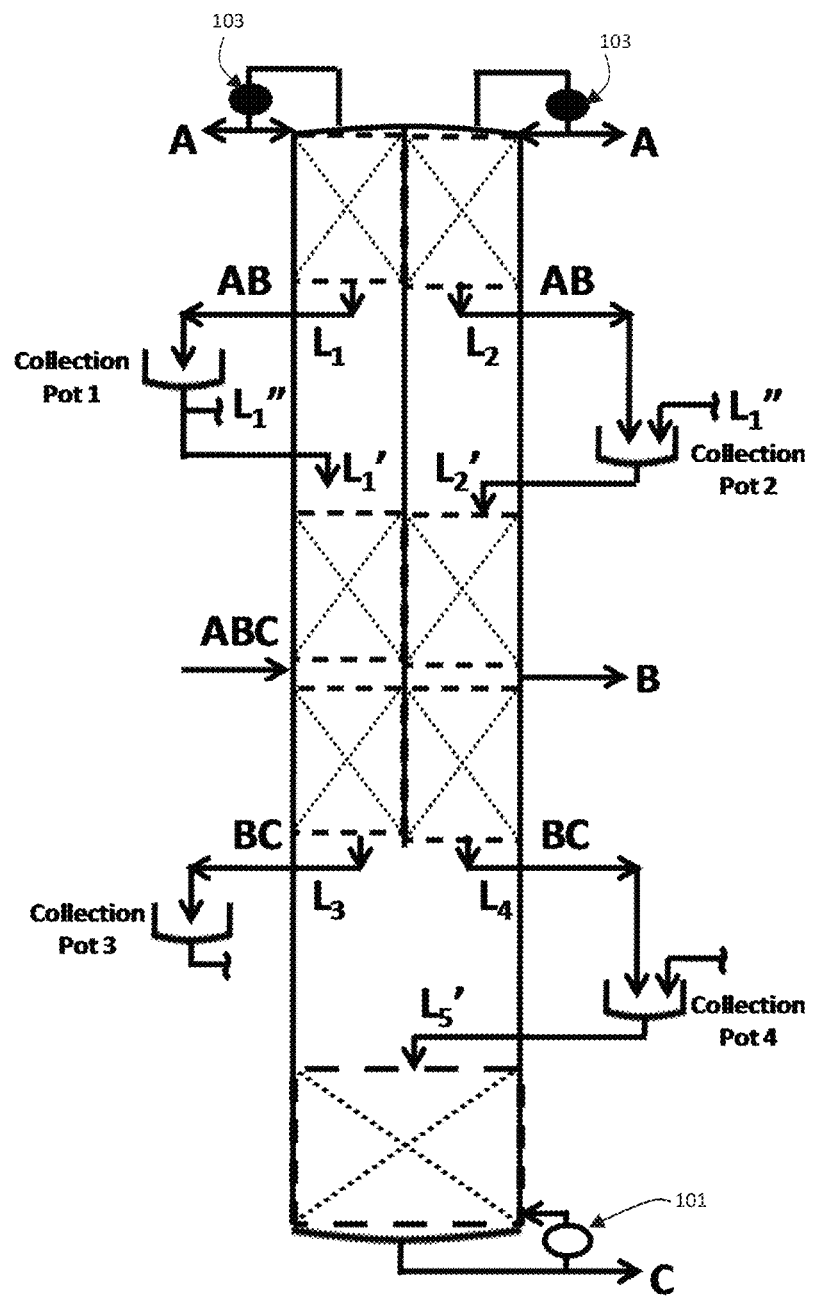
FIG. 9 is a schematic showing an L-TC column.

In FIGS. 8a, 8b, and 8c, the new, more operable dividing wall column versions of the L-TC, TC-L and L-L configurations are introduced: the L-TC, TC-L and L-L columns. Note that the same names will be used later when the same structures are used for higher component separations. A distinct feature of all the dividing wall columns of FIGS. 8a, 8b, and 8c is that the liquid transfers associated with the submixtures AB and BC that are explicitly shown, are made around the vertical partition. This is achieved by collecting the liquid of desired quantity from an intermediate location of one zone ($Z_1$), and then feeding it to an intermediate location of the other zone ($Z_2$), on the other side of the vertical partition. An example of such a liquid transfer is shown for the L-TC column in FIG. 9. The liquid flows can be managed either through gravitational head or use of pumps. Valves in the liquid lines (not shown in the figure) could be used to manipulate the liquid split from collection pot 1. There is no vapor exchange between the two intermediate locations of the two parallel zones of the vertical partition. Thus, the vertical partitions are continuous. It should be noted that even though a vertical partition is continuous, the liquid that is to be transferred around the vertical partition to the other side of the column could be transferred through a pipe that will penetrate through the vertical partition to the other side, but no vapor is exchanged between the two locations. In this case, the end effect will be the same as shown in FIG. 9. Such constructions in all the new dividing wall columns eliminates the constraint that the pressure drop in the two parallel zones, on either side of the vertical partition, be equal. This feature of the new dividing wall columns, as will be seen, makes them more operable than the conventional TC-TC column.

The L-TC column, like the TC-TC column, has one vapor split at the bottom of the vertical partition. However, the two condensers 103 at A in the L-TC column can be artificially used to create a desired pressure drop in zones $Z_1$ and/or $Z_2$ of the vertical partition. This can be achieved by either placing a valve in the piping before the condenser 103, or, by controlling the inlet temperature of the cooling medium within each of the condensing heat exchangers. For example, assume the condensing fluid in both the condensers 103 of the L-TC column to be pure benzene, the outlets to be pure saturated liquid benzene and an approach temperature of the pure saturated liquid benzene with respect to the cooling medium to be 10° C. in both condensers 103. At 1000 mm Hg, benzene condenses at approximately 90° C., which means the inlet cooling medium for both condensers 103 is at 80° C. However, if the inlet cooling medium temperature of one condenser 103 is raised by 10° C., to 90° C., maintaining the same approach temperature, benzene condenses at approximately 100° C., 1050 mm Hg in this condenser 103. Thus, this increase in pressure at the outlet saturated liquid benzene of this condenser 103 results in reduced pressure drop across the respective zone and hence, reduced split of vapor through the respective zone at the bottom of the partition. Simultaneously, the inlet temperature of the cooling medium in the other condenser 103 may also have to be appropriately modified for achieving desired vapor splits. Alternatively, the heat exchanger may be designed to be a submersible heat exchanger, whereby, submergence of the passage for the condensing fluid can be controlled to tailor the active area through which most of the heat transfer takes place. This will control the condensing temperature, and hence the pressure of the condensing fluid. The control of the pressure at the top of either of the zones $Z_1$ or $Z_2$ of the vertical partition will tailor the pressure drop across that zone, and hence the vapor flowrate through that zone. Thus, the L-TC column offers an indirect control on the vapor split at the bottom of the vertical partition.

Interestingly, the TC-L and L-L columns have no vapor splits. The two reboilers 101 at C can be used to operate each section in the two parallel zones, on either side of the vertical partition, at the desired L/V ratios. It is worth noting that, in the case of the L-L column, the two parallel zones can be operated like two independent distillation columns, which may give the configuration more flexibility and freedom to operate.

Figure 10A:
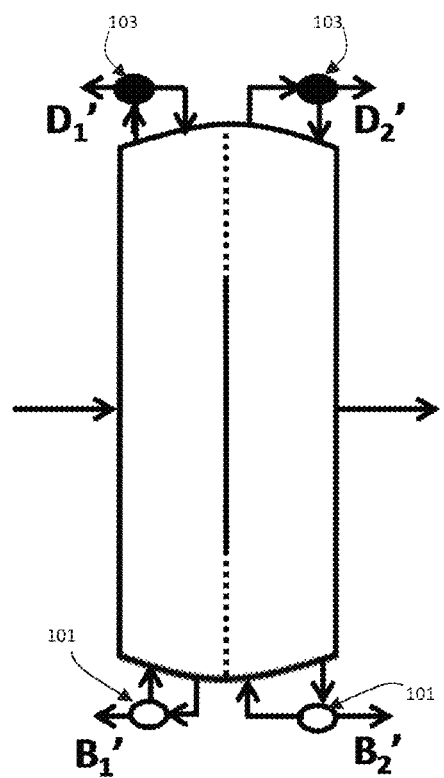
FIG. 10a is a schematic of a dividing wall column from FIG. 5(a) of the paper by Ho et al.
Figure 10B:
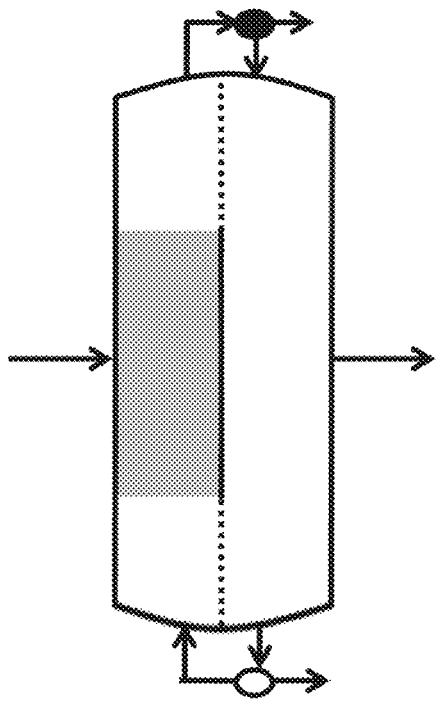
FIG. 10b is a schematic of a dividing wall column from FIG. 11(c) of the paper by Ho et al.
Figure 11A:
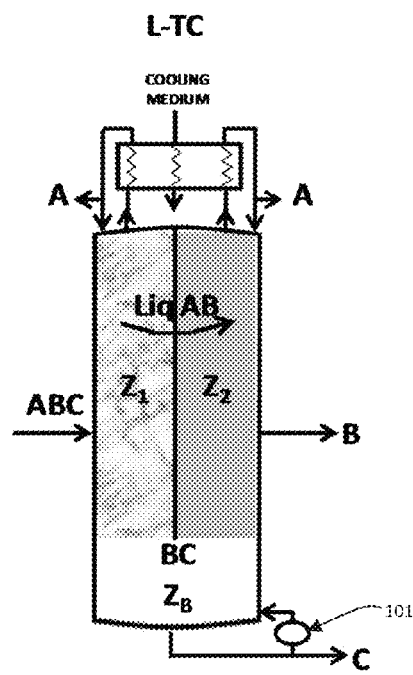
FIG. 11a is a schematic showing one possible arrangement of the L-TC column with one reboiler and condenser.
Figure 11B:
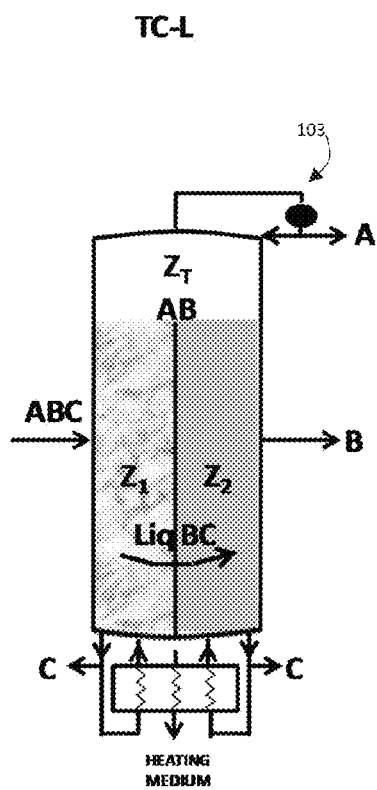
FIG. 11b is a schematic showing one possible arrangement of the TC-L column with one reboiler and condenser.
Figure 11C:
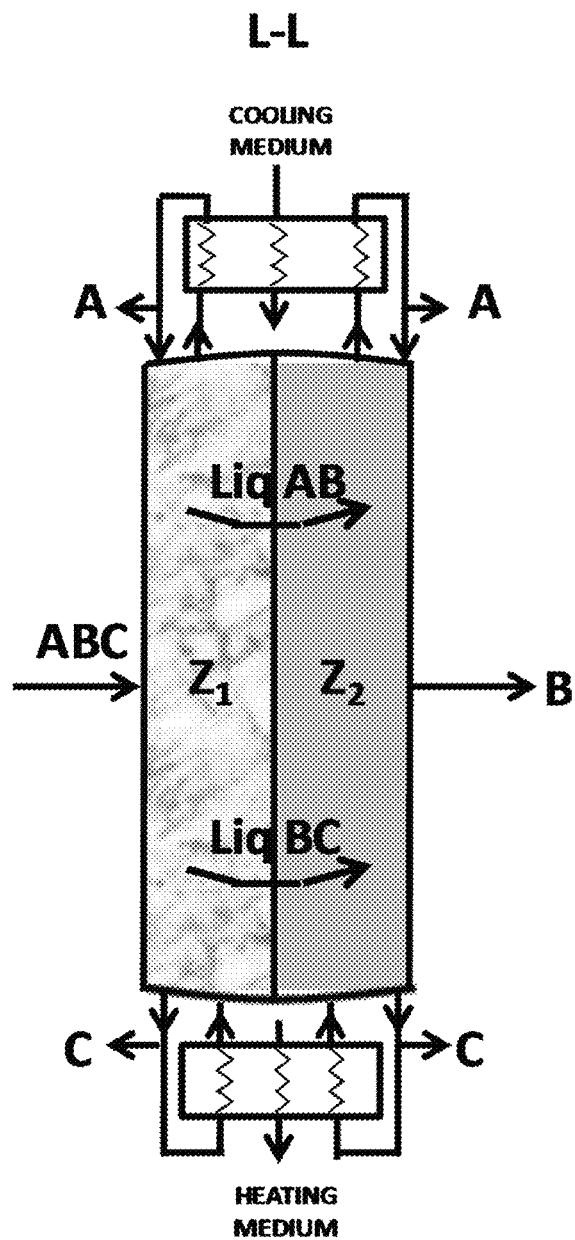
FIG. 11c is a schematic showing one possible arrangement of the L-L column with one reboiler and condenser.

A dividing wall column somewhat similar to the L-L column in FIG. 8c can be found in FIGS. 5(a) and 11(c) of the paper by Ho et al. Their figures are exactly replicated herein in FIGS. 10a and 10b. From the TC-TC column of FIG. 5, they arrive at the dividing wall columns of FIGS. 10a and 10b by fictitiously extending the vertical partition to the top and bottom of the distillation column. They represent these fictitious extensions to the vertical partition in their paper by dotted lines as shown in FIGS. 10a and 10b. Thus, in the dividing wall columns of FIGS. 10a and 10b, only the part of the vertical partition that also exists in the TC-TC column of FIG. 5 is real and the rest is fictitious and does not exist. Likewise, in their dividing wall column, the liquid transfers of submixtures AB and BC are also fictitious. They use such a fictitious dividing wall column concept only to develop certain analytical expressions, and hence the improved operability of our columns is neither identified nor applicable here.

The L-TC and TC-L columns use one more heat exchanger, and the L-L column uses two more than the TC-TC column. Arrangements can be made to each dividing wall column of FIG. 8 to reduce the total number of heat exchangers to two. One possible arrangement of the L-TC, TC-L and L-L columns with one reboiler 101 and condenser 103 is shown in FIGS. 11a, 11b, and 11c. In the L-TC column of FIG. 11a, cooling utility of sufficiently low temperature is used as a common condensing medium to simultaneously condense pure A vapor collected from both the parallel zones, $Z_1$ and $Z_2$ of the vertical partition. To achieve this, the heat exchanger has two separate passages for the vapor collected from the two zones. The condenser heat exchanger is designed so that the condensing fluid in each of the passages can achieve its own desired approach temperature to the cooling medium temperature. This can be implemented in several possible ways. Each passage can be designed with different active surface area to tailor the approach temperature. Alternatively, the passage for the cooling medium can also be divided into two. The flowrate and inlet temperature of the cooling medium for each of the passages may be independently controlled to allow for differences in the temperature of the condensing fluids. Likewise, in the TC-L column of FIG. 11b, pure C liquid collected from the two parallel zones, $Z_1$ and $Z_2$ of the vertical partition, is fed to two separate passages in the reboiler 101. A common heating medium of sufficiently high temperature is used to simultaneously vaporize the liquid in the two passages. Similar to the condenser heat exchanger for L-TC column, the vapor boilup rate in each of the passages of the reboiler 101 can be controlled to provide the desired split of vapor flow between the vertical partition's zones $Z_1$ and $Z_2$. In the L-L column of FIG. 11c, the condenser 103 and reboiler 101 arrangements, respectively of FIGS. 11a and 11b, are used.

Figure 12A:
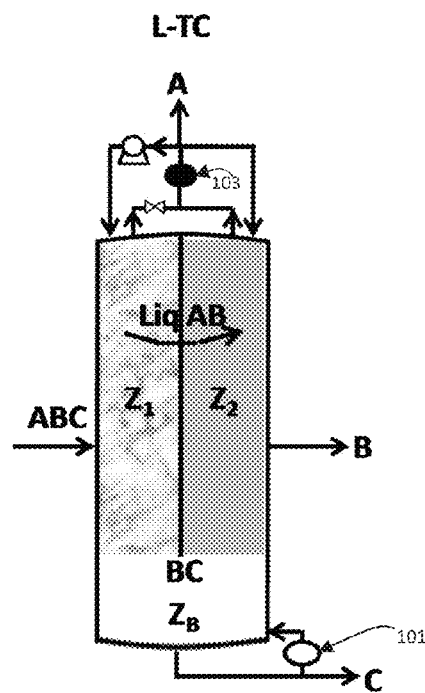
FIG. 12a is a schematic showing an alternate arrangement for the L-TC column with one reboiler and condenser.
Figure 12B:
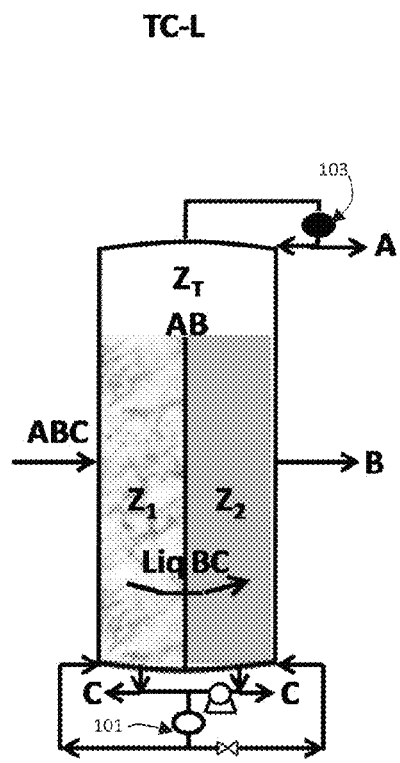
FIG. 12b is a schematic showing an alternate arrangement for the TC-L column with one reboiler and condenser.
Figure 12C:
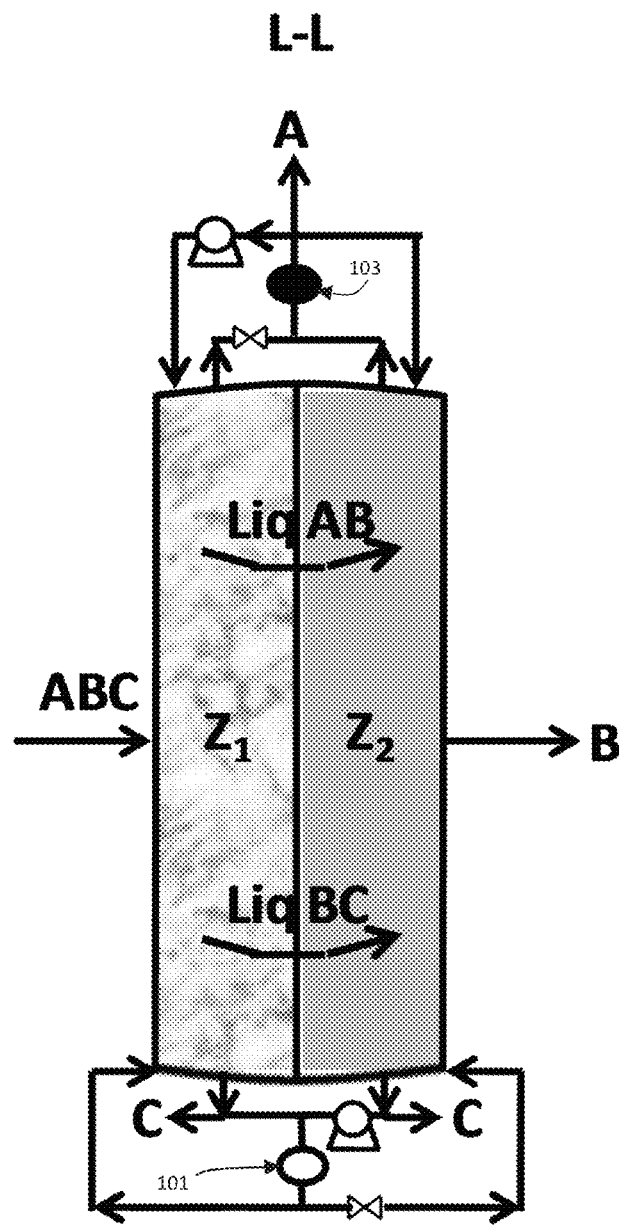
FIG. 12c is a schematic showing an alternate arrangement for the L-L column with one reboiler and condenser.

FIGS. 12a and 12b and 12c show an alternate arrangement for the L-TC, TC-L and L-L columns with one reboiler 101 and condenser 103. In the L-TC column of FIG. 12a, a throttling valve is provided in the vapor line leaving the vertical partition's zone $Z_1$ (assuming that the top of zone $Z_1$ is at a higher pressure than the top of zone $Z_2$) to reduce the pressure of the vapor to that leaving the vertical partition's zone $Z_2$. The combined vapor is condensed in a single heat exchanger. A part of the condensed pure liquid A is withdrawn as product, while the rest is used as reflux to the two zones. The reflux to zone $Z_1$ of the vertical partition is pumped. Alternatively, the condenser heat exchanger could be located at such a height that liquid reflux to the vertical partition's zone $Z_1$ could be fed under gravitational head. In the TC-L column of FIG. 12b, a pump is provided in the liquid line leaving the vertical partition's zone $Z_2$ (assuming that the bottom of zone $Z_2$ is at a lower pressure than the bottom of zone $Z_1$) to increase the pressure of the liquid to that leaving the vertical partition's zone $Z_1$. The combined liquid is boiled in the reboiler 101, and used for boil-up to the two zones. A throttling valve is used in the vapor line entering zone $Z_2$ of the vertical partition for reducing the pressure. Alternatively, the bottom of the column with respect to the reboiler 101 inlet could be located at such a height to allow liquid drain from zone $Z_2$ of the vertical partition via gravitational head without the use of a pump.

The L-L column of FIG. 12c uses the condenser 103 and reboiler 101 arrangements of FIGS. 12a and 12b respectively. In FIGS. 12a, 12b, and 12c, for the purpose of illustration, the throttling valves and pumps are shown before/after streams that enter/leave one of the two parallel zones. In general, depending on the pressure in the two parallel zones of the dividing wall column, the pump and the throttling valves may be switched between either zone. Furthermore, the configurations shown in FIGS. 12a, 12b, and 12c can be suitably modified to use compressors (either in combination with pumps or independently), resulting in alternate single reboiler 101 and condenser 103 arrangements.

Minimum Heat Duty Requirements & Operational Flexibility for Ternary Feeds

Under the assumptions of ideal mixtures and constant molar flow conditions, through modeling and extensive computation, we have observed that the total minimum vapor requirement for the TC-TC, L-TC, TC-L and L-L distillation columns are equal. It is also observed for a number of feed conditions that the range of ratio of splits of vapor in zones $Z_1$ and $Z_2$ of the vertical partition are also equal in all the four distillation columns.

Figure 3:
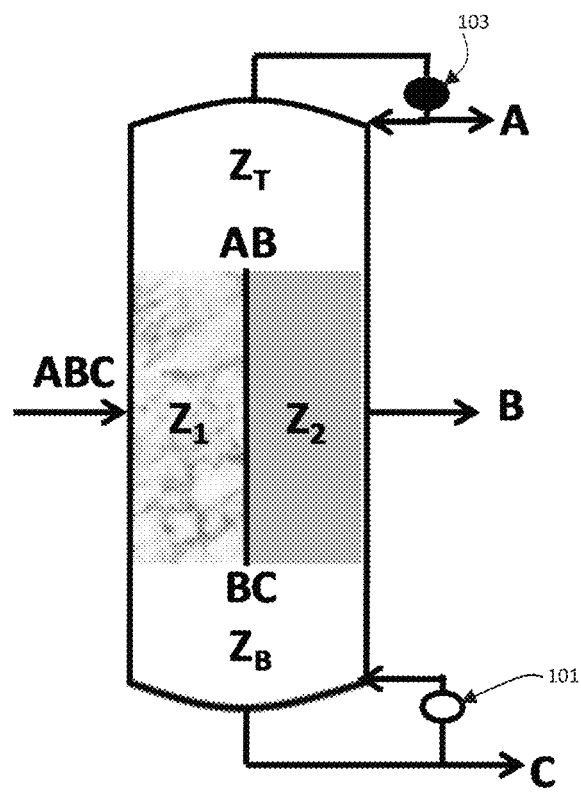
FIG. 3 is a schematic showing a version of the TC-TC configuration.
Figure 4A:
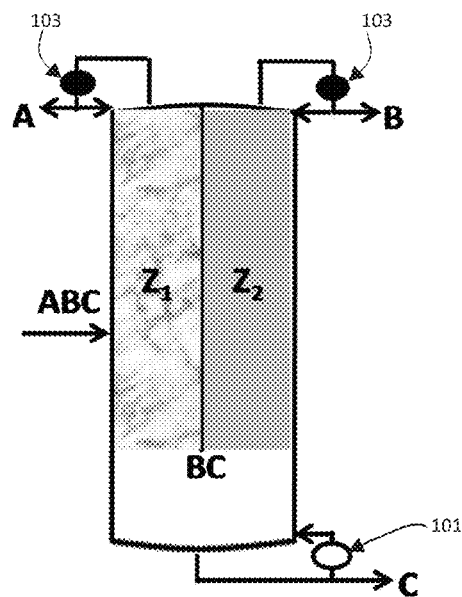
FIG. 4a is a schematic showing a dividing wall column.
Figure 4B:
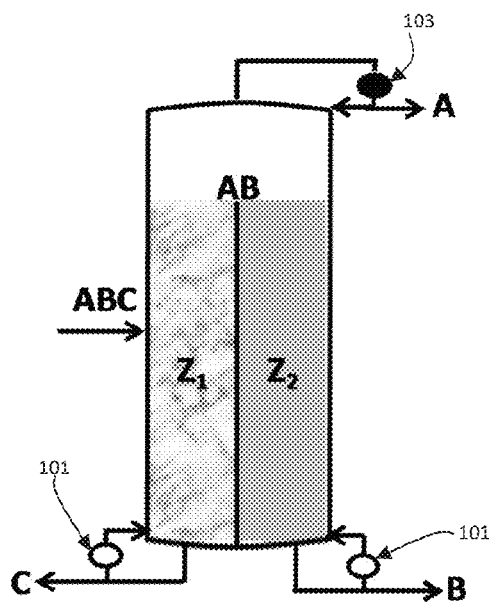
FIG. 4b is a schematic showing a dividing wall column.
Figure 13A:
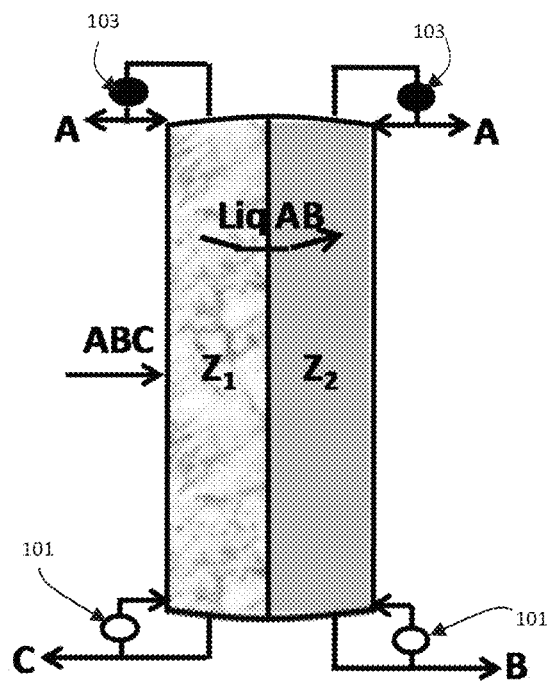
FIG. 13a is a schematic showing that in the L-L column, if no liquid BC is transferred across the vertical partition, with only the liquid AB transfer, the column could produce B from the bottom of the vertical partition's zone $Z_2$.
Figure 13B:
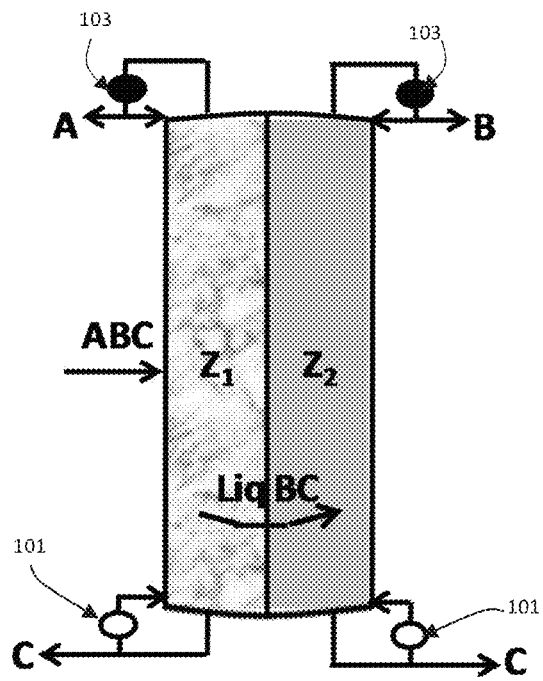
FIG. 13b is a schematic depicting a situation where liquid BC is transferred but no liquid AB is transferred, B could be produced from the top of the vertical partition's zone $Z_2$ of the L-L column, leading to the operation similar to a side rectifier.

There is yet another flexibility of the L-TC, TC-L and L-L columns of FIG. 8, which is missing from the TC-TC column of FIG. 3. Once physically built, they also allow operation in the side rectifier and side stripper modes. For example, in the L-L column, if no liquid BC is transferred across the vertical partition, with only the liquid AB transfer, the column could produce B from the bottom of the vertical partition's zone $Z_2$, as shown in FIG. 13a. In this case, no B may be produced from an intermediate location of the vertical partition's zone $Z_2$. This will be analogous to the operation of a side stripper. In an alternate case, as shown in FIG. 13b, where liquid BC is transferred but no liquid AB is transferred, B could be produced from the top of the vertical partition's zone $Z_2$ of the L-L column, leading to the operation similar to a side rectifier. Thus, a L-L column, once built, can be operated as a fully thermally coupled column/side rectifier/side stripper. Similarly, without the liquid AB transfer across the vertical partition, the L-TC column could be operated in the side rectifier mode of FIG. 4a, while the TC-L column, without the liquid BC transfer, could be operated in the side stripper mode of FIG. 4b. This added flexibility can be quite advantageous, as, for certain feed conditions, a side rectifier or a side stripper may be thermodynamically more efficient than the fully thermally coupled TC-TC configuration. Conversely, a dividing wall column already built on a plant to operate in the side rectifier/side stripper mode can be suitably modified to operate as a L-TC/TC-L column respectively.

New, More Operable n-Component Dividing Wall Columns:

Generally, the overall cost saving from dividing wall columns significantly increases with the number of components in the feed. In this section, it is demonstrated that the disclosed method can also be easily used to draw new more operable dividing wall columns for the distillation of feeds containing more than three components. The method is illustrated by drawing new, more operable, standalone dividing wall columns that separate a four-component feed into four pure products. The focus will be on the dividing wall columns derived from the fully thermally coupled configuration. Similar dividing wall columns for higher number of components can be easily drawn.

Figure 14A:
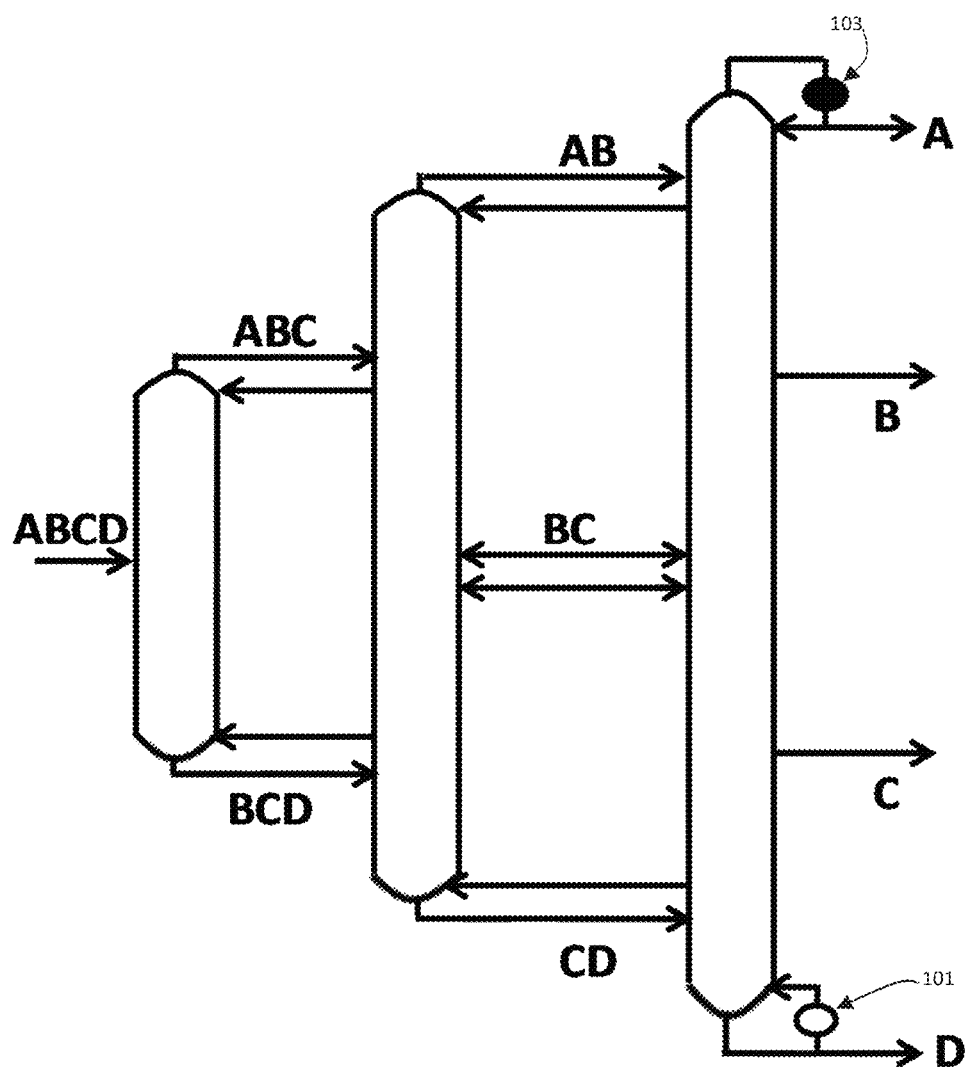
FIG. 14a is a schematic showing a thermally coupled four-component configuration.
Figure 14B:
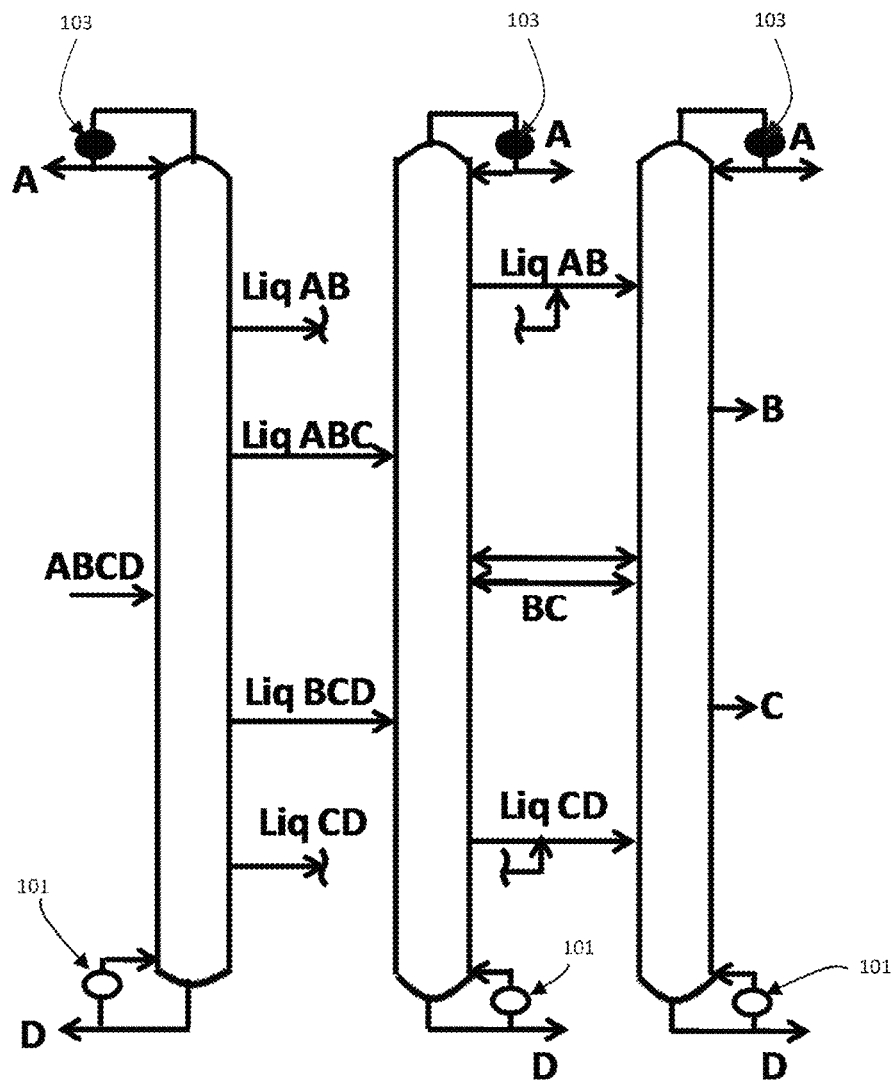
FIG. 14b is a schematic showing a three-column configuration with all liquid transfers and only one vapor transfer between distillation columns.
Figure 15A:
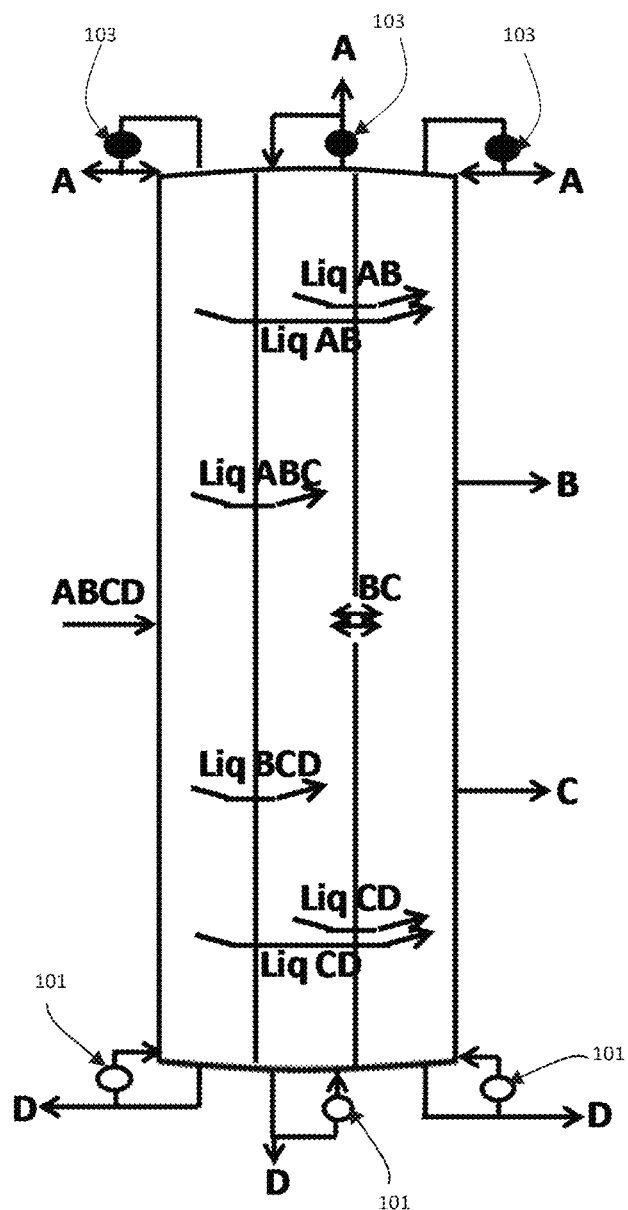
FIG. 15a is a schematic showing a dividing wall version of the configuration in FIG. 14b.
Figure 15B:
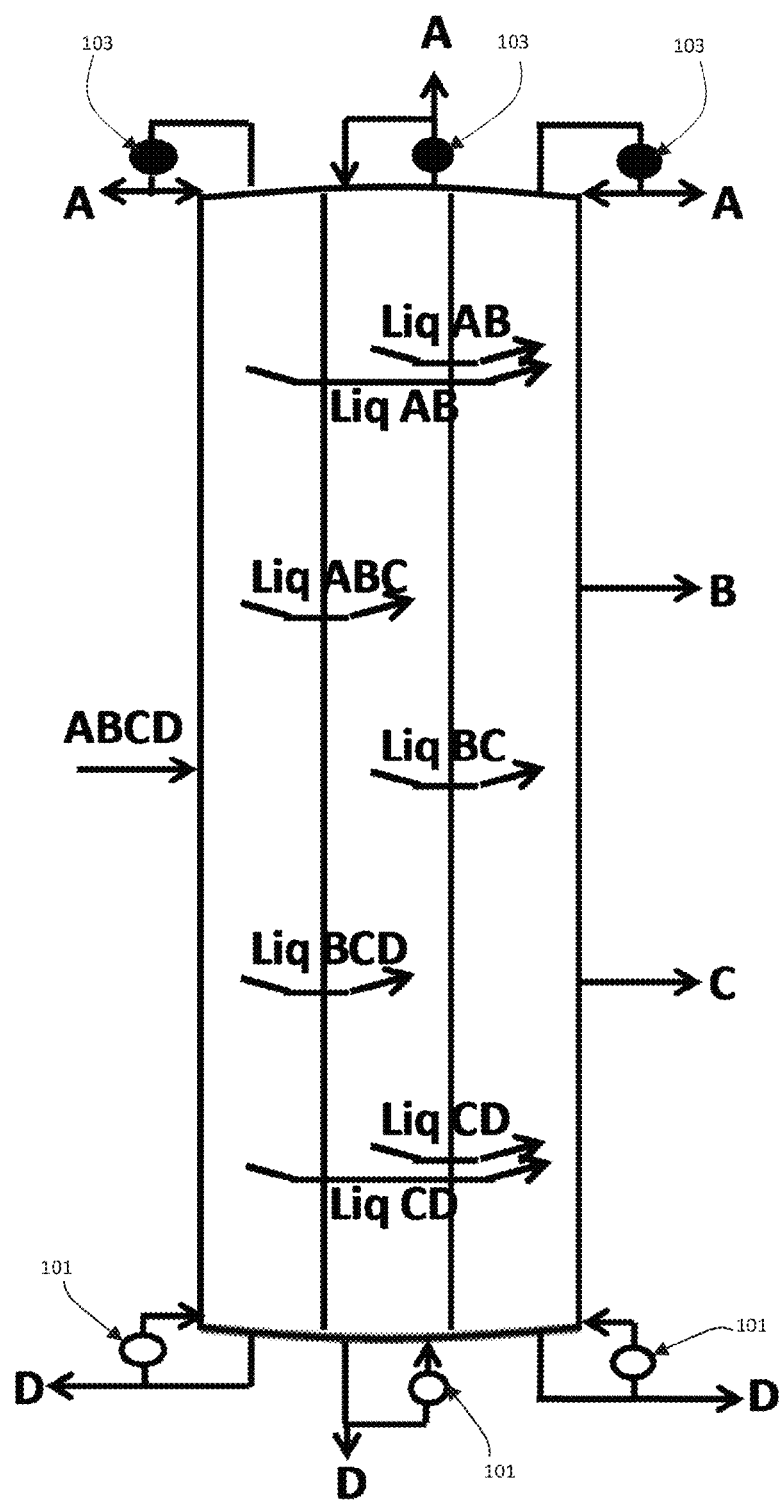
FIG. 15b is a schematic of a simplified version of the dividing wall column in FIG. 15a, with three parallel zones and only liquid splits.

The fully thermally coupled four-component configuration is shown in FIG. 14a. The equivalent three-column configuration with all liquid transfers and only one vapor transfer between distillation columns, as shown in FIG. 14b, was suggested by Agrawal. The two configurations, in terms of minimum heat duty requirement, are expected to be equivalent. A dividing wall version of the configuration in FIG. 14b is shown in FIG. 15a. The only vapor split present in this dividing wall column at the intermediate location of submixture BC, can be controlled by the condensers 103 and reboilers 101 at A and D respectively, as discussed earlier for the ternary feeds. A simplified version of the dividing wall column in FIG. 15a is shown in FIG. 15b, with three parallel zones and only one liquid splits. The dividing wall column in FIG. 15b differs from that in FIG. 15a only due to the mode of transfer of submixture BC. We expect the minimum heat duty requirement of the dividing wall column in FIG. 15b to be comparable to that in FIG. 15a. Each zone in FIG. 15b may be operated akin to a separate distillation column. In contrast to the one and zero vapor splits in FIGS. 15a and 15b, the dividing wall version of the four-component fully thermally coupled column (not shown here) has three vapor splits, all of which are unregulated during operation.

Figure 17:
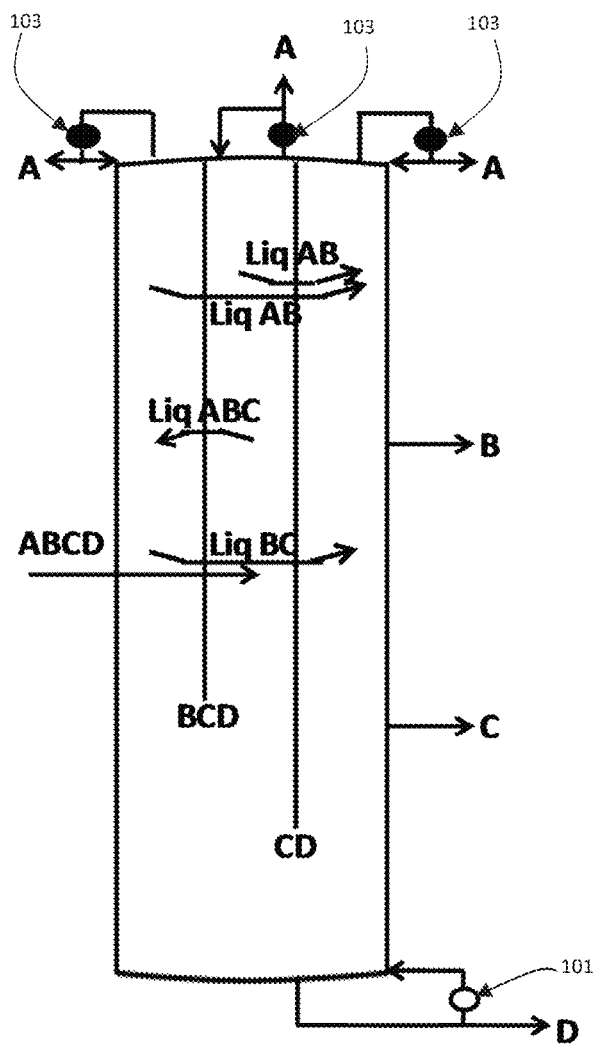
FIG. 17 is a schematic showing that a dividing wall column equivalent to that of FIG. 16d.

At least eighteen variants of the dividing wall column of FIG. 15b (or 15a) can be drawn by introducing thermal coupling links at different submixtures. Four such more operable variants are shown in FIG. 16. While the dividing wall columns of FIGS. 16a and 16b have no vapor splits, the dividing wall columns of FIGS. 16c and 16d respectively have one and two. The vapor splits in the FIGS. 16c and 16d can be controlled by the condensers 103 at A. Furthermore, the dividing wall column of FIG. 16d is equivalent to the one shown in FIG. 17. The two dividing wall columns of FIGS. 17 and 16d differ only due to the location where the feed mixture is fed to the dividing wall column, however the sequence of separations in both the columns is the same. Similarly, the dividing wall columns referred to in this patent application could also refer to any of their equivalent dividing wall columns.

Figure 18:
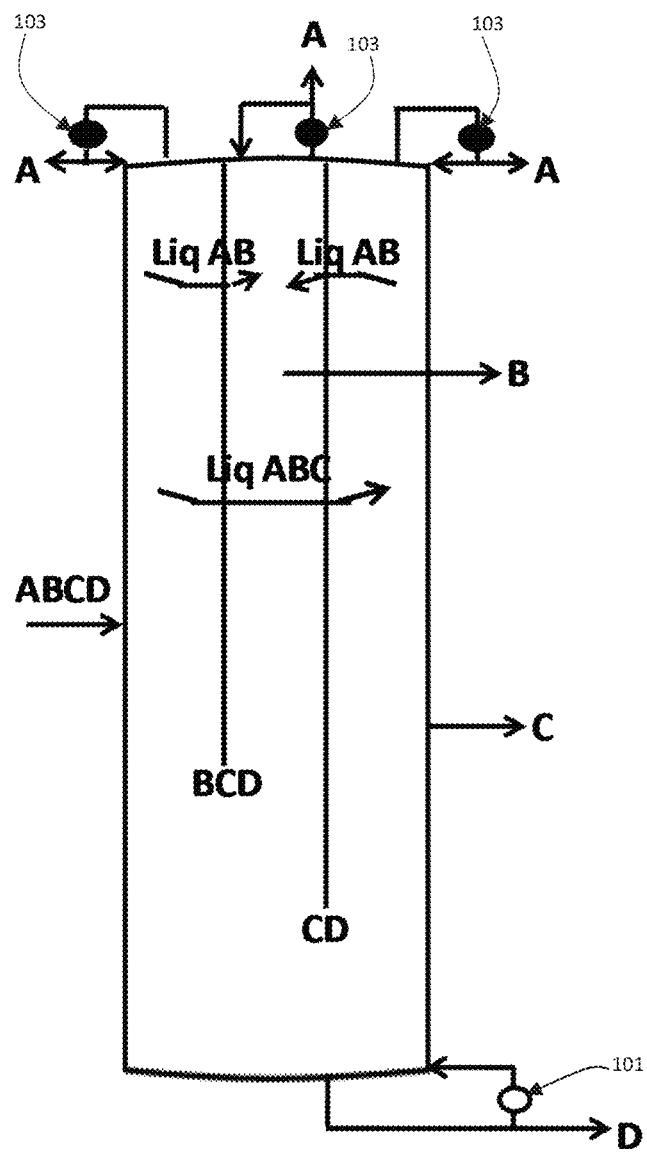
FIG. 18 is a schematic showing an example dividing wall column, similar in skeleton structure to the one in FIG. 16d, but equivalent to the four-component satellite column.

While we have shown the more operable dividing wall columns derived from the fully thermally coupled configuration, other such more operable dividing wall columns derived from the various well-known four component configurations can be drawn, which may offer other benefits. An example dividing wall column, similar in skeleton structure to the one in FIG. 16d, but equivalent to the four-component satellite column is shown in FIG. 18. A feature of this dividing wall column, that is absent in the rest of the dividing wall columns introduced so far, is that the intermediate volatility products B and C are produced from the intermediate locations of two different partitioned zones. Furthermore, as shown earlier for three-component dividing wall columns in FIGS. 11a-11c and 12a-12c, the total number of condenser and reboiler heat exchangers in each of the presented four-component dividing wall columns can be reduced.

In this work, we focused on the new, more operable dividing wall columns derived primarily from the fully thermally coupled multicomponent configurations. However, using the concept proposed by Agrawal, any thermal coupling link can be converted to a liquid only transfer. Such a liquid transfer can be incorporated in a dividing wall column as explained in this paper. Furthermore, our proposed method can also be easily applied to feeds containing more than four components.

Application of the New n-Component Dividing Wall Structures to Feeds with More than n-Components:

The disclosed new n-component skeleton dividing wall structures presented earlier can be easily adapted to separate a multicomponent feed containing more than n components.

In such cases, product streams enriched in different components will be produced. However, the possible product streams and the number of operating modes increase rapidly with the number of components in the feed. Any of these operating modes can be included within a larger flowsheet that separates multicomponent mixtures into component product streams. We will first illustrate the adaptation of the various operating modes of the L-TC, TC-L and L-L columns, originally drawn for the distillation of a ternary feed, to a quaternary feed mixture, ABCD. Then, as a generalization of our approach, a quinary mixture will be distilled using one of our quaternary skeleton dividing wall structures.

The L-TC, TC-L and L-L columns have two submixture transfers from intermediate locations, one above the feed and the other below the feed (AB and BC in the earlier studied three-component case). When a quaternary feed mixture ABCD is distilled in these columns, there are two possible submixtures, ABC or AB, which could be transferred from an intermediate location above the feed. Similarly, from an intermediate location below the feed, the two possible submixture transfers are BCD or BC. This implies that, for each of the three vertical partitioned columns, we have four possible combinations of the two submixtures. FIG. 19(a)-19(l) shows these combinations.

Some interesting observations can be made from FIG. 19(a)-19(l). When compared to the TC-TC column for separating ABCD (not shown), the L-TC, TC-L and L-L columns of FIG. 19(a)-19(l), apart from better vapor split control, offer an additional flexibility to produce two different products from the top or/and bottom of the column. For example, in the L-TC and L-L columns of FIGS. 19(a) and 19(c), stream A can be produced as a product from the top of one zone, while stream AB may be produced as a product from the top of the other. Similarly, in TC-L and L-L columns of FIGS. 19(b) and 19(c), one has an option to produce stream D from the bottom of one zone, and CD from the bottom of the other zone. Furthermore, in some of the dividing wall columns of FIG. 19(a)-19(l), one sidedraw stream may be withdrawn from zone $Z_2$, if desirable, instead of two.

Figure 19F:
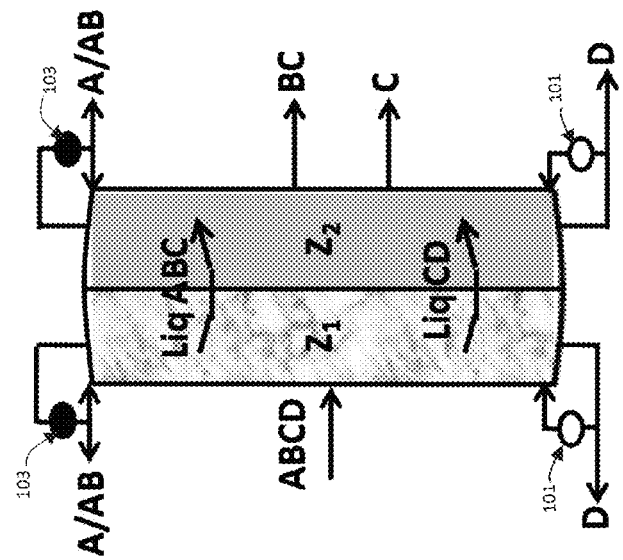
Figure 19E:
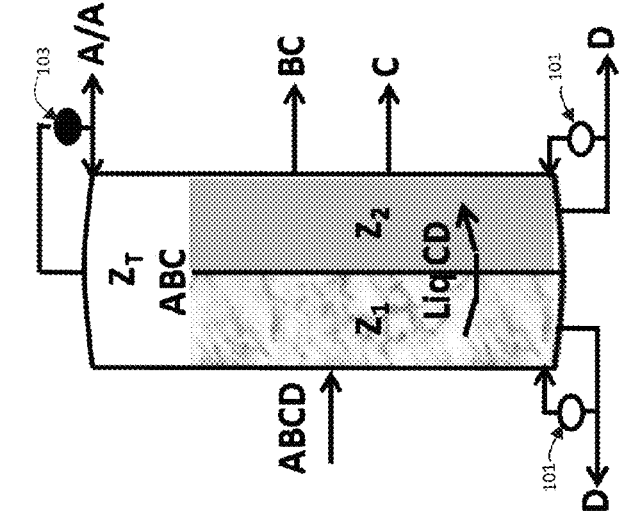
Figure 19D:
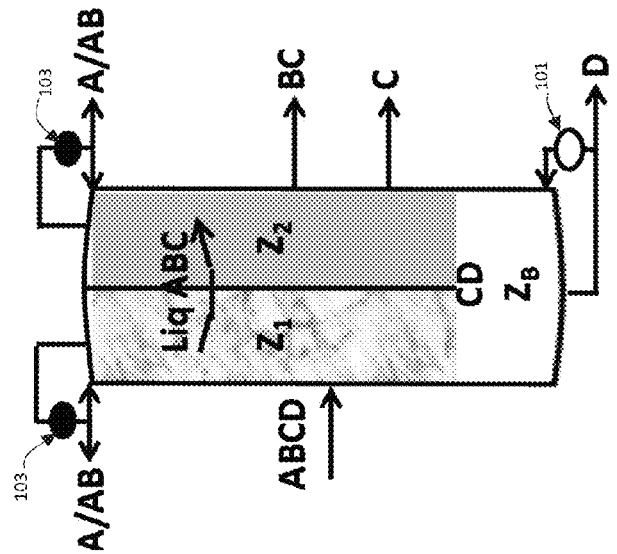
Figure 19I:
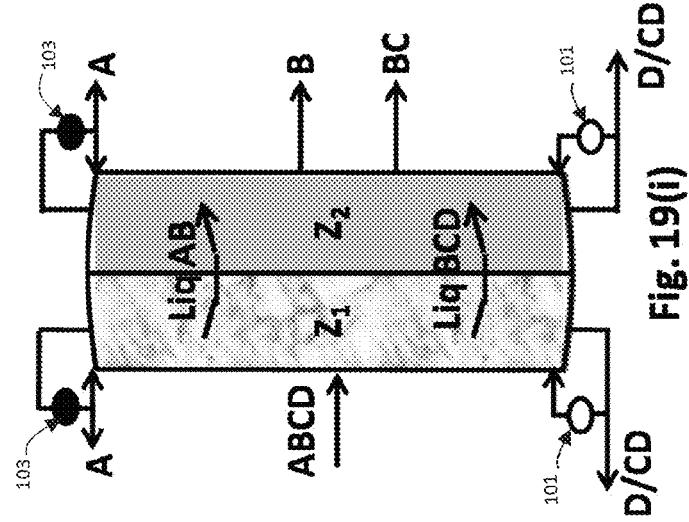
Figure 19H:
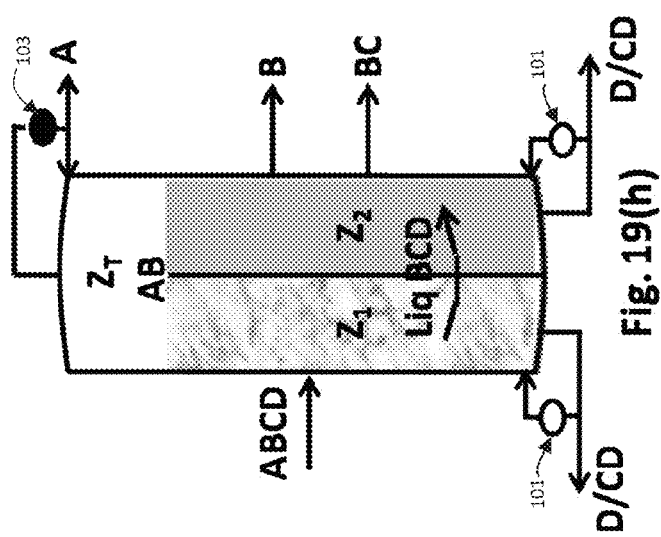
Figure 19G:
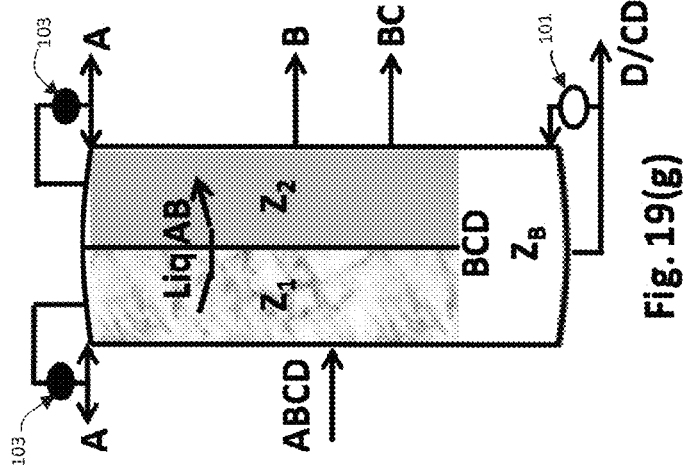
Figure 19L:
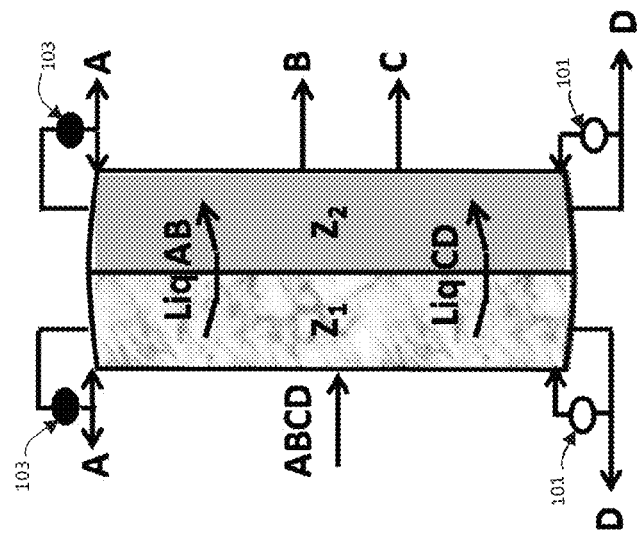
Figure 19K:
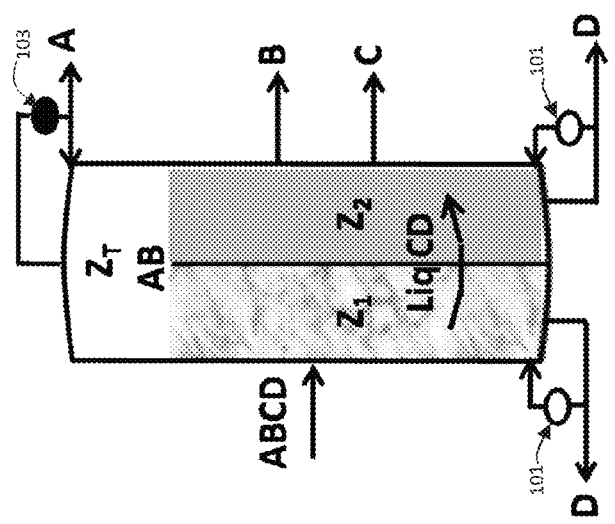
Figure 19J:
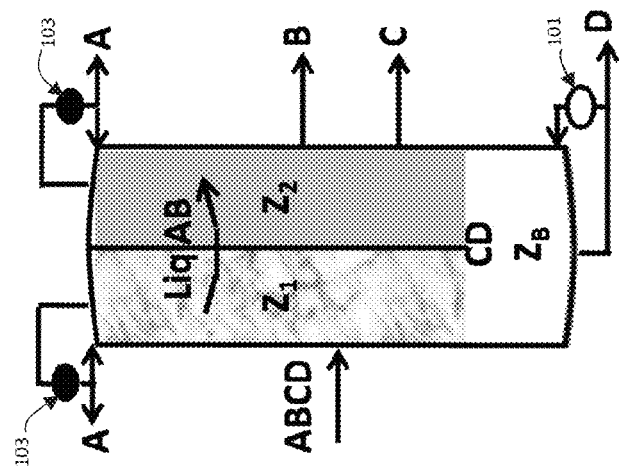
Figure 20H:
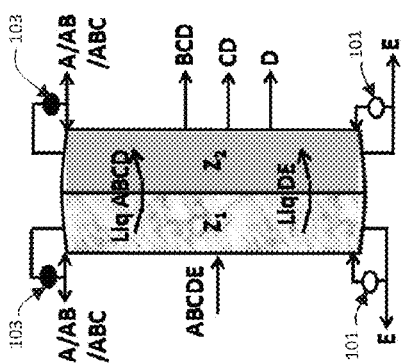
Figure 20G:
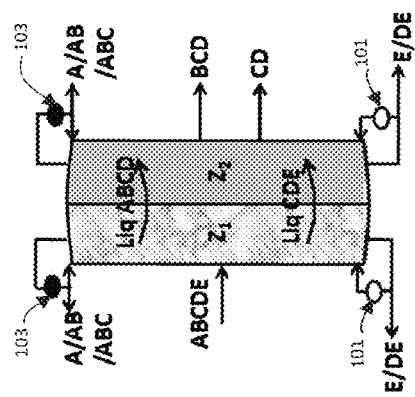
Figure 20F:
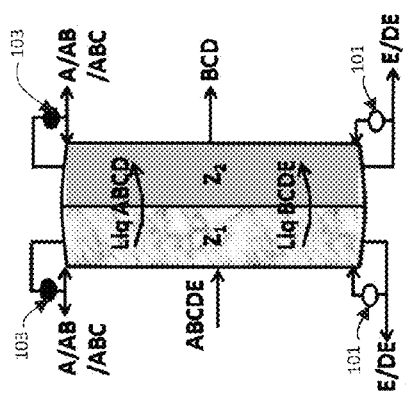
Figure 20E:
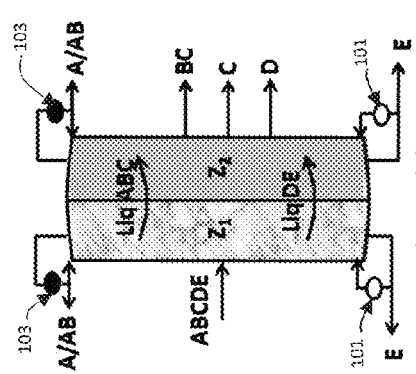

An interesting case emerges in FIGS. 19(j) through 19(l), where all the products may be produced with high purity. The sequence of component splits/separations shown in FIGS. 19(j), 19(k) and 19(l), using the TC-TC column, has been known in the past. The use of our new L-TC, TC-L and L-L columns instead, allows for a better control of vapor flow on each side of the vertical partition. This makes it easy to control the production of pure B and C product streams from an operating plant. Also, the column may now be operated closer to its designed optimal heat duty.

Figure 21B:
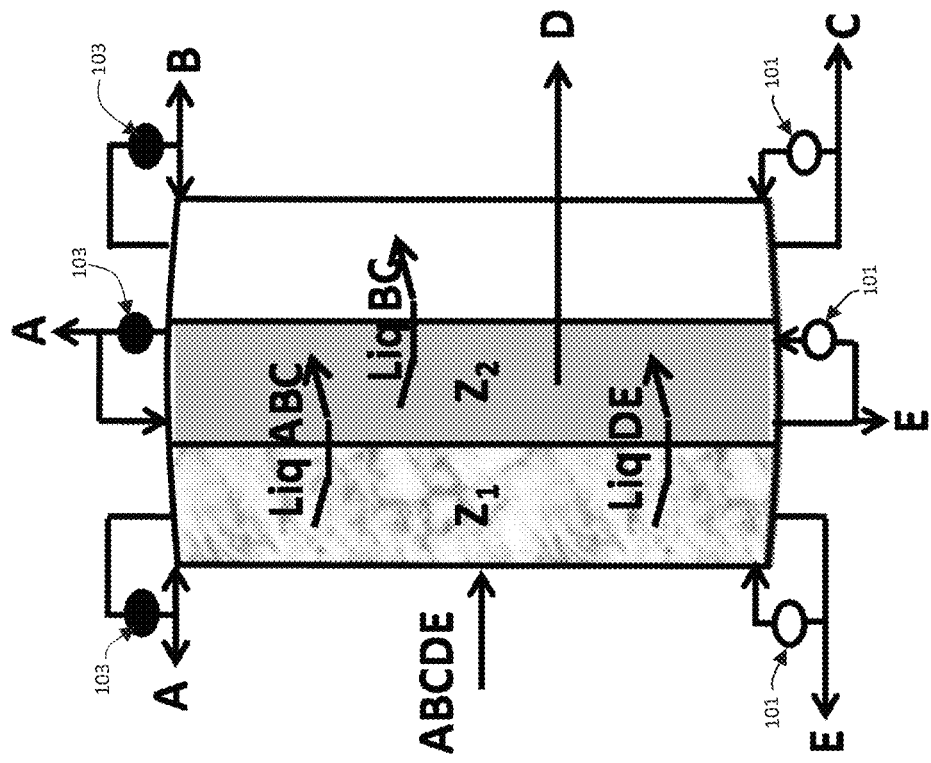
FIGS. 21a and 21b are schematics showing extensions to dividing wall columns of FIGS. 20(b) and 20(e) to produce streams of pure products.
Figure 21A:
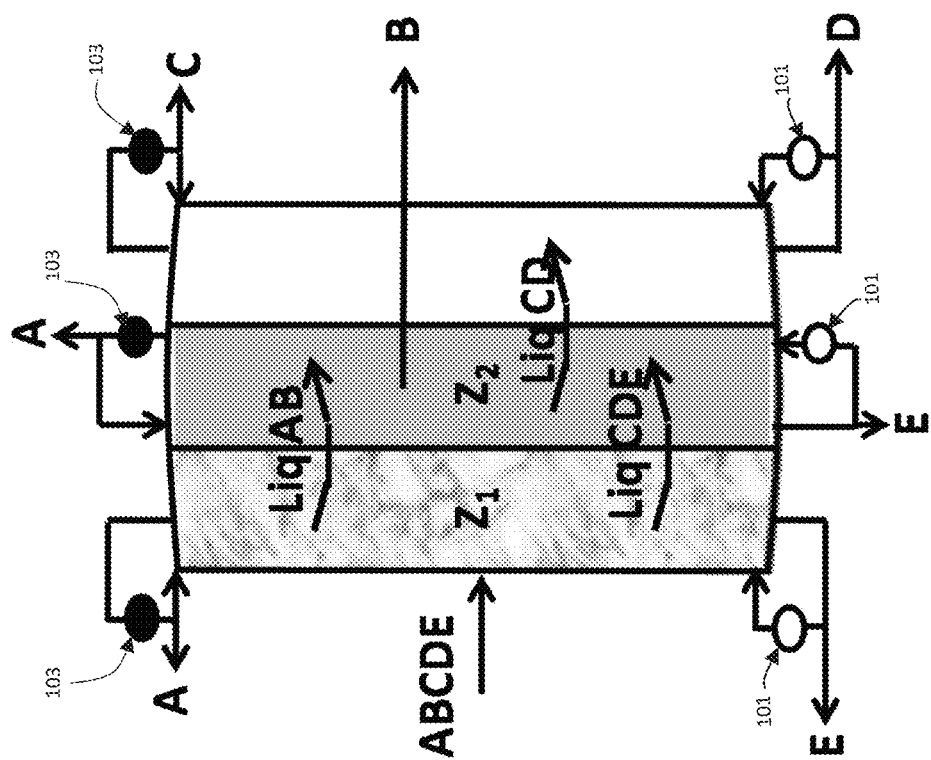

Based on the observations made for quaternary mixtures, the various operating modes of the L-L column to separate a quinary mixture are shown in FIG. 20(a)-20(h). Some of the intermediate withdrawal streams from zone $Z_2$ of these distillation columns may be eliminated, if desired. It is clear that the concept can also be applied to L-TC and TC-L columns. The dividing wall columns of FIG. 20 can be further extended to produce streams of pure products. As an example, extensions to dividing wall columns of FIGS. 20(b) and 20(e) to produce streams of pure products are shown in FIGS. 21(a) and 21(b). These dividing wall columns have been obtained by adding an extra distillation zone to those in FIGS. 20(b) and 20(e). The intermediate volatility components, B, C and D are produced from the ends of the new zone in these dividing wall columns. Interestingly, the skeleton partition structure with three parallel zones in the dividing wall columns of FIGS. 21(a) and 21(b) is the same as that shown in FIG. 15(b), a standalone dividing wall column for separating a quaternary feed mixture. This generalizes our concept of using the n-component skeleton dividing wall partition structure, and adapting it for the distillation of a mixture with more than n components.

Those skilled in the art will recognize that numerous modifications can be made to the specific implementations described above. The implementations should not be limited to the particular limitations described. Other implementations may be possible.

REFERENCES

1. Petlyuk F B, Platonov V M, Slavinskii D M. Thermodynamically Optimal Method for Separating Multicomponent Mixtures. Int Chem Eng. 1965; 5(3):555-561.
2. Fidkowski Z T, Krolikowski L. Thermally coupled system of distillation columns: optimization procedure. AIChE J. 1986; 32:537-546.
3. Triantafyllou C, Smith R. The Design and Optimization of Fully Thermally Coupled Distillation Columns. Trans Inst Chem Eng. 1992; 70:Part A, 118.
4. Agrawal R, Fidkowski Z T. More operable arrangements of fully thermally coupled distillation columns. AIChE J. 1998; 44(11):2565-2568.
5. Wright R O. Fractionation Apparatus. 1949. U.S. Pat. No. 2,471,134.
6. Kaibel G. Distillation Columns with Vertical Partitions. Chem Eng Tech. 1987; 10(1):92-98.
7. Kaibel B, Jansen H, Zich E, Olujic Z. Unfixed Dividing Wall Technology For Packed And Tray Distillation Columns. Distill Absorpt. 2006; 152:252-266.
8. Yildirim O, Kiss A A, Kenig E Y. Dividing wall columns in chemical process industry: A review on current activities. Sep Pur Tech. 2011; 80:403-417.
9. Asprion N, Kaibel G. Dividing wall columns: Fundamentals and recent advances. Chem Eng Process. 2010; 49:139-146.
10. Dejanovic I, Matijasevic L, Olujic Z. Dividing wall column—A breakthrough towards sustainable distilling. Chem Eng Process. 2010; 49:559-580.
11. Sangal V K, Bichalu L, Kumar V and Mishra I M. Importance of pressure drop in divided wall distillation column. Asia-Pac J Chem Eng. 2013; 8:85-92.
12. Lestak F, Collins C. Advanced distillation saves energy & capital. Chem Eng. 1997; 104(7):72-76.
13. Dejanovic I, Matijasevic L, Jansen H, Olujic Z. Designing a Packed Dividing Wall Column for an Aromatics Processing Plant. Ind Eng Chem Res. 2011; 50:5680-5692.
14. Mutalib M I A, Smith R. Operation And Control Of Dividing Wall Distillation Columns. Part 1: Degrees of Freedom and Dynamic Simulation. Trans Inst Chem Eng. 1998; 76:Part A:308-318.
15. Maralani L T, Xigang Y, Yiqing L, Chao G, Guocong Y. Numerical Investigation on Effect of Vapor Split Ratio to Performance and Operability for Dividing Wall Column. Chin J Chem Eng. 2013; 21(1):72-78.
16. Agrawal R. Multicomponent Columns with Partitions and Multiple Reboilers and Condensers. Ind Eng Chem Res. 2001; 40(20):4258-4266.
17. Agrawal R, Fidkowski Z T. Are Thermally Coupled Distillation Columns Always Thermodynamically More Efficient for Ternary Distillations? Ind Eng Chem Res. 1998; 37(8):3444-3454.
18. Agrawal R. Thermally Coupled Distillation with Reduced Number of Intercolumn Vapor Transfers. AIChE J. 2000; 46(11):2198-2210.
19. Ho Y C, Ward J D, Yu C C. Quantifying Potential Energy Savings of Divided Wall Columns Based on Degree of Remixing. Ind Eng Chem Res. 2011; 50(3):1473-1487.
20. Agrawal R. Synthesis of Distillation Column Configurations for a Multicomponent Separation. *Ind Eng Chem Res*. 1996; 35(4):1059-1071.
21. Brugma A J. Process and Device for Fractional Distillation of Liquid Mixtures, More Particularly Petroleum. U.S. Pat. No. 2,295,256, 1942.
22. Cahn R P, Di Miceli A G. Separation of multicomponent mixture in single tower. U.S. Pat. No. 3,058,893, 1962.
23. Tragut C, Kaibel G. Continuous isolation of a high-melting material by distillation. U.S. Pat. No. 6,387,222 B1. 2002.
24. Wostbrock K, Kaibel G, Tragut C, Anken G. Purification of ammonia by distillation. U.S. Pat. No. 7,001,490 B2 2006.
25. Kaibel G, Oost C, Stroezel M, Meyer G, Trubenbach P, Sartor K, Heners J. Method and device for carrying out the distillative separation of c5+ cuts. US 2004/0011706 A1. 2004.
26. Kaibel G, Weck A, Rahn R. Method for distillative separation of mixtures containing tetrahydrofuran, 3-butyrolactone and or 1,4-butanediol. U.S. Pat. No. 6,846,389 B2. 2005.
27. Gall M, Kaibel G, Krug T, Rust H, Stein F. Method and device for the distillative processing of 1,6-hexanediol, 1,5-pentanediol and caprolactone. U.S. Pat. No. 7,329,330 B2. 2008.
28. Bassler P, Gobbel H, Teles J, Rudolf, P. Method for the continuous intermediate separation of an oxirane produced by the oxirane synthesis with no coupling product by means of a partition-wall column. US 2006/0014969 A1. 2006.
29. Bassler P, Gobbel H, Teles J, Rudolf, P. Method for the continuous purification by distillation of 1,2-propylene glycol that accumulates during the synthesis of propylene oxide without coupling products. U.S. Pat. No. 7,332,634 B2. 2008.
30. Heydrich G, Krug T, Richter I. Method for distilling an electrolyte containing tmof. EP 1514955 B1. 2006.
31. Heydrich G, Richter I, Krug T. Method for processing compositions containing 1,1,2,2-tetramethoxyethane and glyoxal dimethyl aceta. U.S. Pat. No. 7,211,698 B2.2007.
32. Hugo R, Jourdan S, Wenz K, Preiss T, Weck A. Preparation of xylylenediamine (XDA). U.S. Pat. No. 7,368,610 B2. 2008.
33. Siegert M, Lang N, Stroefer E, Stammer A, Friese T. Method for the Separation by Distillation of Pure Trioxane. US 2007/0293688 A1.2007.
34. Woelfert A, Pallasch H, Stroefer E, Blankertz H. Method for the purification of isocyanates. U.S. Pat. No. 8,088,944 B2. 2012.
35. Heydrich G, Gralla G, Ebel K, Krause W, Kashani-Shirazi N. Continuous process for preparing menthol in pure or enriched form. U.S. Pat. No. 8,414,744 B2.2013.
36. Heydrich G, Kashani-Shirazi N, Jakel C, Schmidt-Leithoff, J. Continuous process for preparing neral in pure or enriched form. U.S. Pat. No. 8,282,793 B2.2012.
37. Windecker G, Kaibel G, Steiniger M, Buntrock T, Weiguny J, Hautte D V, Lurquin T. Process for obtaining maleic anhydride by distillation. US 2010/0113805 A1. 2010.
38. Muller D, Wagner P, Schwegler B, Notheis U, Armbrust R, Heinz H, Wagner A. Preparation of trimethylolpropane. U.S. Pat. No. 7,211,701 B2.
39. Brady B, Steffens F, Keggenhoff B, Verkerk K, Ruffert G. Process for the purification of mixtures of toluene-diisocyanate incorporating a dividing-wall distillation column. U.S. Pat. No. 7,118,653 B2.2006.
40. Schultz M A, Lankton S P, Tagamolila C P. Apparatus for Producing Ethylbenzene or Cumene. U.S. Pat. No. 7,713,386 B2.2010.
41. Schultz M A, Maher G F. Process for making xylene isomer using a deheptanizer with a side draw recycle. U.S. Pat. No. 7,371,912 B2.2008.
Schultz M A, Towler G P, Brady J P, Lechnick W. Amine treatment in light olefin processing. U.S. Pat. No. 7,687,048 B1. 2010.

What is claimed is:

1. A method, comprising:
feeding a feed stream comprising a more volatile component, at least one intermediate volatile component, and a less volatile component to a feed location on a distillation column, the distillation column having a top end, a bottom end, and at least one partition within the distillation column, and the feed location having a first intermediate location along the length of the distillation column;
feeding the feed stream to a first zone, the first zone is vertically between the top end and bottom end of a first partition, and horizontally between the boundary of the distillation column and the first partition, the first partition having a top end that extends from the top of the distillation column and a bottom end that extends to a location above the bottom of the distillation column;
withdrawing at least one liquid stream depleted in the less volatile component from a second intermediate location which is located at an intermediate location of the first zone, and the second intermediate location is configured to be above the feed location, to form a first intermediate stream;
feeding the first intermediate stream to a second zone in the distillation column, the second zone having a location along a second partition in the distillation column;
withdrawing at least one stream enriched in the more volatile component from a first withdrawing location in the first zone, the first withdrawing location is above the second intermediate location;
withdrawing at least one stream enriched in the more volatile component from a second withdrawing location in the second zone, the second withdrawing location is above the location where the first intermediate stream is fed;
withdrawing at least one stream enriched in the intermediate volatile component from the second zone, at a location below where the first intermediate stream is fed and above the bottom of the second partition; and
withdrawing at least one stream enriched in the less volatile component from a location in the distillation column that is below the bottom of the first partition.

2. The method of claim 1, the distillation column is configured to be operated such that relative vapor flow rates and relative liquid flow rates in a plurality of zones are controlled at least one of the top end or the bottom end of the distillation column.

3. The method of claim 2, the second zone is located on a side opposing the first zone along the first partition, the first partition is same as the second partition.

4. The method of claim 2, the relative vapor flow rates and relative liquid flow rates are controlled by usage of pumps and/or control valves in vapor and liquid lines.

5. The method of claim 2, achieved by condensing the vapor streams from the top of the first zone and the second zone at differing temperatures.

6. A method, comprising:
feeding a feed stream comprising a more volatile component, at least one intermediate volatile component, and a less volatile component to a feed location on a distillation column, the distillation column having a top end, a bottom end, and at least one partition within the distillation column, and the feed location having a first intermediate location along the length of the distillation column;
feeding the feed stream to a first zone, the first zone is vertically between the top end and bottom end of a first partition, and horizontally between the boundary of the distillation column and the first partition, the first partition having a top end that extends from a location that is below the top of the distillation column and a bottom end that extends to the bottom of the distillation column;
withdrawing at least one liquid stream depleted in the more volatile component from a second intermediate location which is located at an intermediate location of the first zone, and the second intermediate location is configured to be below the feed location, to form a first intermediate stream;
feeding the first intermediate stream to a second zone in the distillation column, the second zone having a location along a second partition in the distillation column;
withdrawing at least one stream enriched in the less volatile component from a first withdrawing location in the first zone, the first withdrawing location is below the second intermediate location;
withdrawing at least one stream enriched in the less volatile component from a second withdrawing location in the second zone, the second withdrawing location is below the location where the first intermediate stream is fed;
withdrawing at least one stream enriched in the intermediate volatile component from the second zone, at a location above where the first intermediate stream is fed and below the top of the second partition; and
withdrawing at least one stream enriched in the more volatile component from a location in the distillation column that is above the top of the first partition.

7. The method of claim 6, the at least one partition is a vertical partition.

8. The method of claim 6, the distillation column is configured to be operated such that relative vapor flow rates and relative liquid flow rates in a plurality of zones are controlled from at least one of the top end or the bottom end of the distillation column.

9. The method of claim 6, the second zone is located on a side opposing the first zone along the first partition, the first partition is same as the second partition.

10. The method of claim 8, the relative vapor flow rates and relative liquid flow rates are controlled by usage of pumps and/or control valves in vapor and liquid lines.

11. The method of claim 8, achieved by boiling the liquid streams from the bottom of the first zone and the second zone at differing temperatures.

12. A method, comprising:
feeding a feed stream comprising a more volatile component, at least one intermediate volatile component, and a less volatile component to a feed location on a distillation column, the distillation column having a top end, a bottom end, and at least one partition within the distillation column, and the feed location having a first intermediate location along the length of the distillation column;
feeding the feed stream to a first zone, the first zone is vertically between the top end and bottom end of a first partition, and horizontally between the boundary of the distillation column and the first partition, the first partition having a top end that extends from the top of the distillation column and a bottom end that extends to the bottom of the distillation column;
withdrawing at least one liquid stream depleted in the less volatile component from a second intermediate location which is located at an intermediate location of the first zone, and the second intermediate location is configured to be above the feed location, to form a first intermediate stream;
feeding the first intermediate stream to a second zone in the distillation column, the second zone having a location along a second partition in the distillation column;
withdrawing at least one stream enriched in the more volatile component from a first withdrawing location in the first zone, the first withdrawing location is above the second intermediate location;
withdrawing at least one stream enriched in the more volatile component from a second withdrawing location in the second zone, the second withdrawing location is above the location where the first intermediate stream is fed;
withdrawing at least one stream enriched in the intermediate volatile component from the second zone, at a third withdrawing location below where the first intermediate stream is fed and above the bottom of the second partition; and
withdrawing at least one liquid stream depleted in the more volatile component from a third intermediate location which is located at an intermediate location of the first zone, and the third intermediate location is configured to be below the feed location, to form a second intermediate stream;
feeding the second intermediate stream to the second zone in the distillation column below the third withdrawing location;
withdrawing at least one stream enriched in the less volatile component from a fourth withdrawing location in the first zone, the fourth withdrawing location is below the third intermediate location; and
withdrawing at least one stream enriched in the less volatile component from a fifth withdrawing location in the second zone, the fifth withdrawing location is below the location where the second intermediate stream is fed.

13. The method of claim 12, the distillation column is configured to be operated such that relative vapor flow rates and relative liquid flow rates in a plurality of zones are controlled at least one of the top end or the bottom end of the distillation column.

14. The method of claim 12, the second zone is located on a side opposing the first zone along the first partition, the first partition is same as the second partition.

15. The method of claim 12, the at least one partition is a vertical partition.

16. The method of claim 13, the relative vapor flow rates and relative liquid flow rates are controlled by usage of pumps and/or control valves in vapor and liquid lines.

17. The method of claim 12, wherein the second intermediate stream is absent, and the stream from the fifth withdrawing location enriched in the less volatile component recovered from the second zone is absent.

18. The method of claim 12, wherein the first intermediate stream is absent, and the stream from the second withdrawing location enriched in the more volatile component recovered from the second zone is absent.

19. The method of claim 12, wherein the distillation column further comprises:
   at least two partitions, the first partition and the second partition, the second partition having a top end that extends from the top of the distillation column and a bottom end that extends to the bottom of the distillation column;
   a second zone, the second zone is configured to be vertically between the top end and bottom end of the second partition, and horizontally between the first partition and the second partition;
   a third zone that is vertically between the top end and bottom end of the second partition, and horizontally between the second partition and the boundary of the distillation column; the streams withdrawn from the first withdrawing location and the second withdrawing location are fed to a fourth intermediate location in the third zone; the stream withdrawn from the third withdrawing location is fed to a fifth intermediate location in the third zone and the fifth intermediate location is below the fourth intermediate location; the streams withdrawn from the fourth withdrawing location and the fifth withdrawing location are fed to a sixth intermediate location in the third zone and the sixth intermediate location is below the fifth intermediate location; at least one stream is withdrawn from the third zone from a location above the fourth intermediate location; at least one stream is withdrawn from the third zone from a vertical location between the fourth intermediate location and the fifth intermediate location; at least one stream is withdrawn from the third zone from a vertical location between the fifth intermediate location and the sixth intermediate location; at least one stream is withdrawn from the third zone from a vertical location below the sixth intermediate location.

* * * * *